(12) United States Patent
Shiroishi

(10) Patent No.: US 10,919,559 B2
(45) Date of Patent: Feb. 16, 2021

(54) STEERING DEVICE

(71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 203 days.

(21) Appl. No.: 16/185,483

(22) Filed: Nov. 9, 2018

(65) Prior Publication Data

US 2019/0152506 A1 May 23, 2019

(30) Foreign Application Priority Data

Nov. 17, 2017 (JP) ................... 2017-221855

(51) Int. Cl.
| | | |
|---|---|---|
| *B62D 1/189* | (2006.01) | |
| *B62D 1/184* | (2006.01) | |
| *B62D 1/187* | (2006.01) | |
| *B62D 1/185* | (2006.01) | |

(52) U.S. Cl.
CPC ............. *B62D 1/184* (2013.01); *B62D 1/187* (2013.01); *B62D 1/189* (2013.01); *B62D 1/185* (2013.01)

(58) Field of Classification Search
CPC .................. B62D 1/187; B62D 1/189
See application file for complete search history.

(56) References Cited

U.S. PATENT DOCUMENTS

| | | | | |
|---|---|---|---|---|
| 5,477,744 A | * | 12/1995 | Hoblingre ............... | B62D 1/181 74/493 |
| 8,770,623 B1 | * | 7/2014 | Palmer .................... | B62D 1/187 280/775 |
| 2002/0140219 A1 | * | 10/2002 | Tsunoda ................. | B62D 1/195 280/779 |
| 2003/0000330 A1 | * | 1/2003 | Murakami ............. | B62D 1/195 74/492 |
| 2008/0284150 A1 | * | 11/2008 | Yamada ................. | B62D 1/184 280/777 |
| 2019/0152507 A1 | * | 5/2019 | Shiroishi ................ | B62D 1/184 |
| 2019/0152510 A1 | * | 5/2019 | Shiroishi ................ | B62D 1/184 |
| 2019/0152511 A1 | * | 5/2019 | Shiroishi ................ | B62D 1/192 |

FOREIGN PATENT DOCUMENTS

JP 2008-284976 11/2008

* cited by examiner

*Primary Examiner* — James A English
(74) *Attorney, Agent, or Firm* — Rankin, Hill & Clark LLP

(57) ABSTRACT

A steering device includes a column unit, a front bracket, a lock bolt, a rear bracket provided with a tilting guide hole, and a second urging member. The column unit is provided with a bumping portion that restricts the column unit from rising by coming into contact with the rear bracket before the lock bolt abuts onto an upper end inner circumferential edge of the tilting guide hole in accordance with rotation of the column unit.

6 Claims, 25 Drawing Sheets

STEERING DEVICE

CROSS-REFERENCE TO RELATED APPLICATION

Priority is claimed on Japanese Patent Application No. 2017-221855, filed on Nov. 17, 2017, the contents of which are incorporated herein by reference.

BACKGROUND OF THE INVENTION

Field of the Invention

The present invention relates to a steering device.

Description of Related Art

There is a steering device that has a tilting function. The tilting function is a function of adjusting the inclination angle of a steering wheel (steering shaft) according to the physique or driving posture of a driver. For example, as shown in FIG. 25, such a steering device 200 is provided with a column 201, a front bracket (not shown), and a rear bracket 203 (for example, refer to Japanese Unexamined Patent Application, First Publication No. 2008-284976 (hereinafter, referred to as Patent Document 1)). The column 201 rotatably supports a steering shaft. The front bracket (not shown) and the rear bracket 203 are attached to a vehicle body and support the column 201.

The front bracket rotatably supports the column 201.

The column 201 is supported by the rear bracket 203 via a rod 202. Specifically, the rod 202 is inserted into a through-hole 201a penetrating the column 201 in a lateral direction. The rear bracket 203 is formed with a tilting guide hole 203a. The tilting guide hole 203a guides vertical movement of the rod 202 in accordance with rotation of the column 201.

Meanwhile, in the case of the configuration in Patent Document 1, an urging member (not shown) that urges the column 201 upward is interposed between the rear bracket 203 and the rod 202.

It is considered that it is possible to restrain the column 201 from falling downward at the time of a tilting motion (tilt balance can be achieved) with the above-described configuration.

In the steering device 200 described above, the inner diameter of the through-hole 201a of the column 201 is set to be a dimension slightly larger than that of the rod 202 in consideration of a variation in dimension or the like.

Therefore, a state where an outer circumferential surface of the rod 202 abuts onto an inner circumferential surface of the through-hole 201a from a lower side due to an urging force of the urging member is maintained.

Gripping a steering wheel and lifting the steering wheel up to a position at which the steering wheel is restricted from rising is a general method of moving the steering wheel (column 201) to an uppermost position in such a configuration.

As shown in FIG. 26, in a process in which the steering wheel is moved up to the uppermost position, the rod 202 abuts onto an upper end inner circumferential edge of the tilting guide hole 203a such that the rod 202 is restricted from rising with respect to the rear bracket 203. At this time, as shown in FIG. 27, the column 201 further rises with respect to the rod 202 corresponding to a gap between the through-hole 201a and the rod 202. Then, the inner circumferential surface of the through-hole 201a abuts onto the outer circumferential surface of the rod 202 from the lower side such that the column 201 is restricted from rising.

However, after a locked state is entered in a state where the column 201 is restricted from rising, the steering wheel (column 201) may fall corresponding to the above-described gap due to own weight of the steering wheel as shown in FIG. 26.

Therefore, an aspect of the present invention provides a steering device with which it is possible to fix a steering wheel at a desired uppermost position.

SUMMARY OF THE INVENTION

In order to solve the aforementioned problems, the present invention adopts the following aspects.

(1) A steering device according to an aspect of the invention includes a column unit that supports a steering shaft such that the steering shaft rotates around a first axis extending in a front-rear direction, a front bracket that is attached to a vehicle body and that supports the column unit such that the column unit rotates around a second axis extending in a lateral direction, a lock bolt that is inserted into a through-hole penetrating the column unit in the lateral direction, a rear bracket that is provided with a tilting guide hole guiding vertical movement of the lock bolt in accordance with rotation of the column unit and that is attached to the vehicle body at a position behind the front bracket, and an urging member that is connected to the lock bolt and urges the column unit upward via the lock bolt. At least one of the column unit and the rear bracket is provided with a bumping portion that restricts the column unit from rising by causing the column unit and the rear bracket to come into contact with each other before the lock bolt abuts onto an upper end inner circumferential edge of the tilting guide hole in accordance with rotation of the column unit.

In the case of the steering device according to the aspect, the column unit and the rear bracket come into contact with each other via the bumping portion before a lock bolt abuts onto an upper end inner circumferential edge of the tilting guide hole in accordance with rotation of the column unit such that the column unit is restricted from rising. Therefore, in a process in which the column unit is moved to a tilt uppermost position and after the column unit is locked at the uppermost position, the column unit can be maintained in a state where an outer circumferential surface of the lock bolt abuts onto an inner circumferential surface of the through-hole from a lower side due to an urging force of the urging member. That is, it is possible to restrain the column unit from wobbling with respect to the lock bolt. As a result, it is possible to fix a steering wheel at a desired tilt uppermost position.

(2) In the steering device according to (1), the rear bracket is preferably provided with an upper wall portion that straddles an upper portion of the column unit and the bumping portion preferably protrudes from a portion of the column unit that is surrounded by the upper wall portion and is preferably configured to come into contact with the upper wall portion.

According to the aspect, since the bumping portion is formed on a portion of the column unit that is surrounded by the upper wall portion, it is possible to fix the steering wheel at a desired uppermost position without a great change in outer shape of the steering device.

(3) In the steering device according to (1) or (2), the bumping portion is preferably provided with a contact surface that comes into contact with the rear bracket and the contact surface is preferably an inclined surface that extends to become closer to a lower side toward a rear side.

According to the aspect, the bumping portion and the rear bracket come into surface-contact with each other at the tilt uppermost position. Accordingly, it is possible to decrease a surface-pressure at the time of contact between the bumping portion and the rear bracket. Therefore, it is possible to suppress deformation of the rear bracket or the like that is caused by contact between the bumping portion and the rear bracket.

(4) In the steering device according to (1) or (2), the bumping portion is preferably formed in a curved shape that protrudes upward.

According to the aspect, a contact point between the bumping portion and the rear bracket is likely to be stabilized even in a case where there is a variation in dimension of the bumping portion.

According to the aspects, it is possible to fix a steering wheel at a desired uppermost position.

DETAILED DESCRIPTION OF THE INVENTION

Next, an embodiment of the present invention will be described on the basis of drawings.

<Steering Device>

Figure 1:
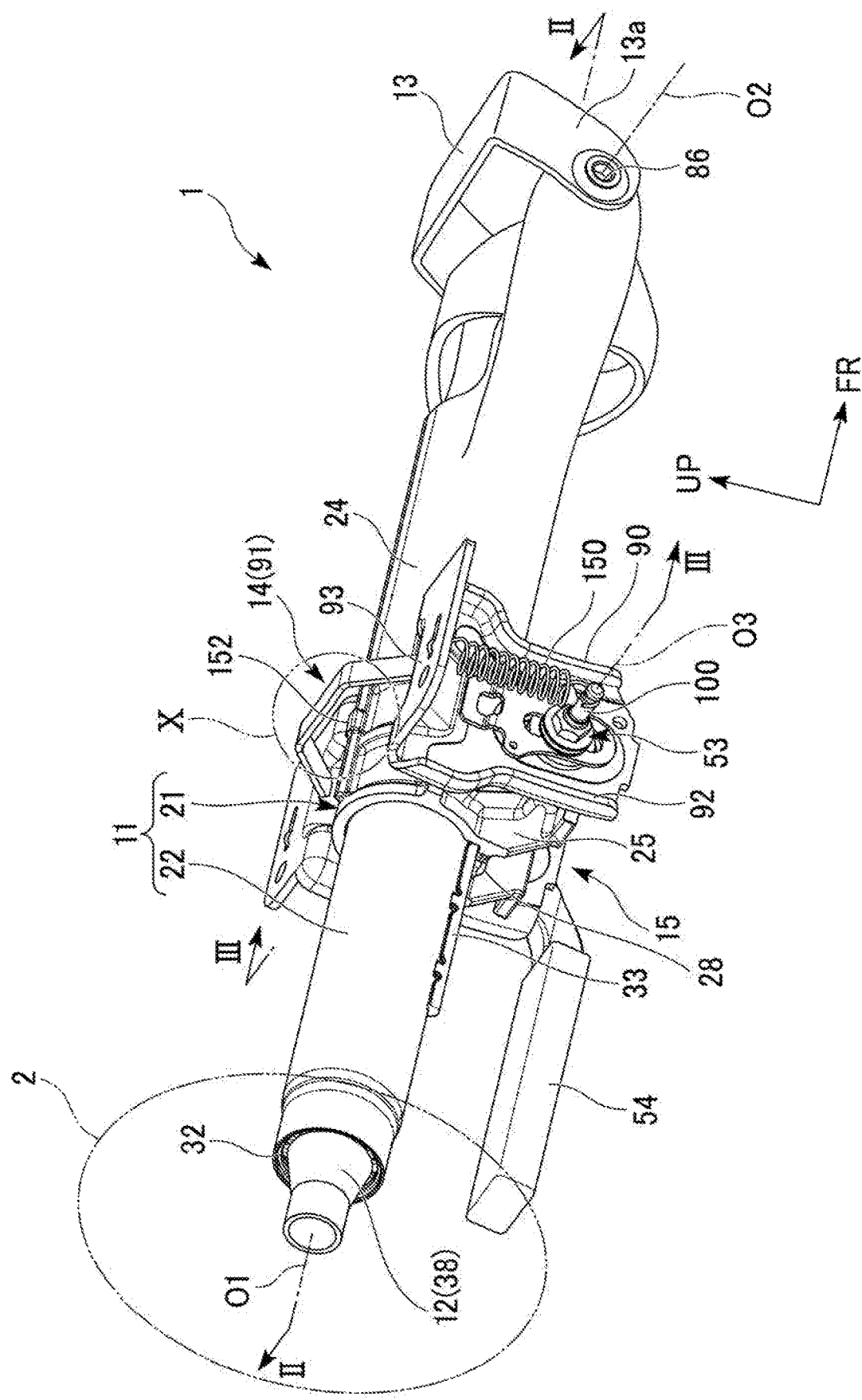
FIG. 1 is a perspective view of a steering device.

FIG. 1 is a perspective view of a steering device 1.

As shown in FIG. 1, the steering device 1 is installed in a vehicle. The steering device 1 adjusts the steering angle of vehicle wheels in accordance with a rotation operation of a steering wheel 2.

The steering device 1 is provided with a column unit 11, a steering shaft 12, a fixation bracket (front bracket 13 and rear bracket 14), and a switching unit 15. Each of the column unit 11 and the steering shaft 12 is formed along an axis (first axis) O1. Therefore, in the following description, a direction in which the axes O1 of the column unit 11 and the steering shaft 12 extend will be simply referred to as an shaft axial direction, a direction orthogonal to the axes O1 will be referred to as a shaft radial direction, and a direction around the axes O1 will be referred to as a shaft circumferential direction in some cases.

The steering device 1 according to the present embodiment is installed in the vehicle in a state where the axis O1 intersects a front-rear direction. Specifically, the axis O1 of the steering device 1 extends to become closer to an upper side toward a rear side. However, in the following description, a direction extending toward the steering wheel 2 in the shaft axial direction of the steering device 1 will be simply referred to as a rearward direction and a direction extending to a side opposite to the steering wheel 2 side will be simply referred to as a frontward direction (arrow FR), for the sake of convenience. A shaft radial direction that is parallel to a vertical direction in a state where the steering device 1 is attached to the vehicle will be simply referred to as a vertical direction (arrow UP represents upper side) and a shaft radial direction that is parallel to a lateral direction will be simply referred to as a lateral direction.

<Column Unit>

The column unit 11 is provided with an outer column 21 and an inner column 22.

The outer column 21 is attached to a vehicle body via the fixation brackets 13 and 14.

The outer column 21 is mainly provided with a tubular holding portion 24 and fastened portions 25.

Figure 2:
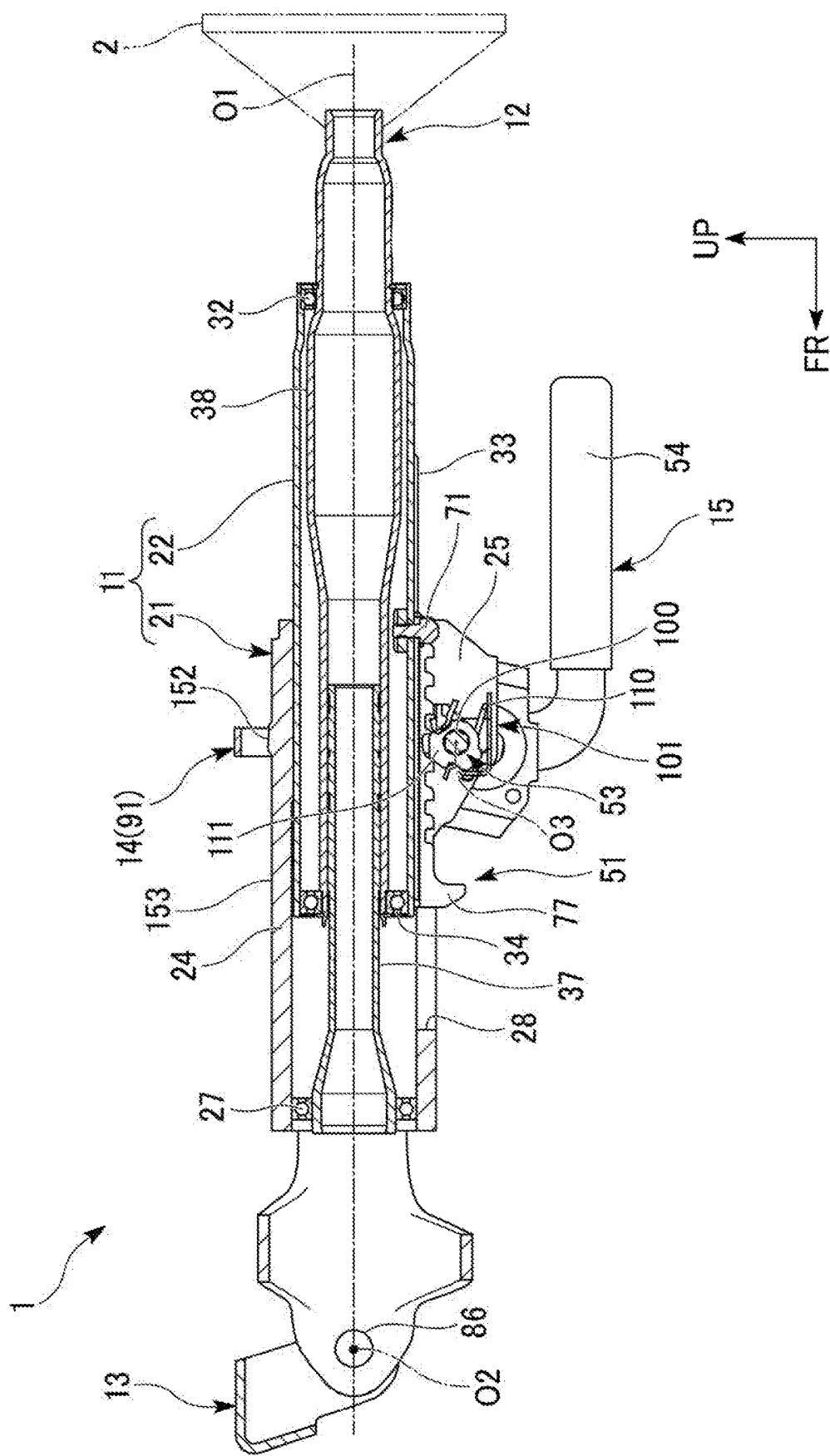
FIG. 2 is a sectional view taken along line II-II in FIG. 1.

FIG. 2 is a sectional view taken along line II-II in FIG. 1.

As shown in FIG. 2, the tubular holding portion 24 is formed into have a tubular shape extending along the axis O1.

An outer ring of a front side bearing 27 is fitted into (press-fitted into) an inner front end portion the tubular holding portion 24. A portion of a rear part of the tubular holding portion 24 in the shaft circumferential direction (in present embodiment, lower portion of outer column 21) is formed with a slit 28. The slit 28 penetrates the outer column 21 in the shaft radial direction and is open at a rear end surface of the outer column 21.

Figure 3:
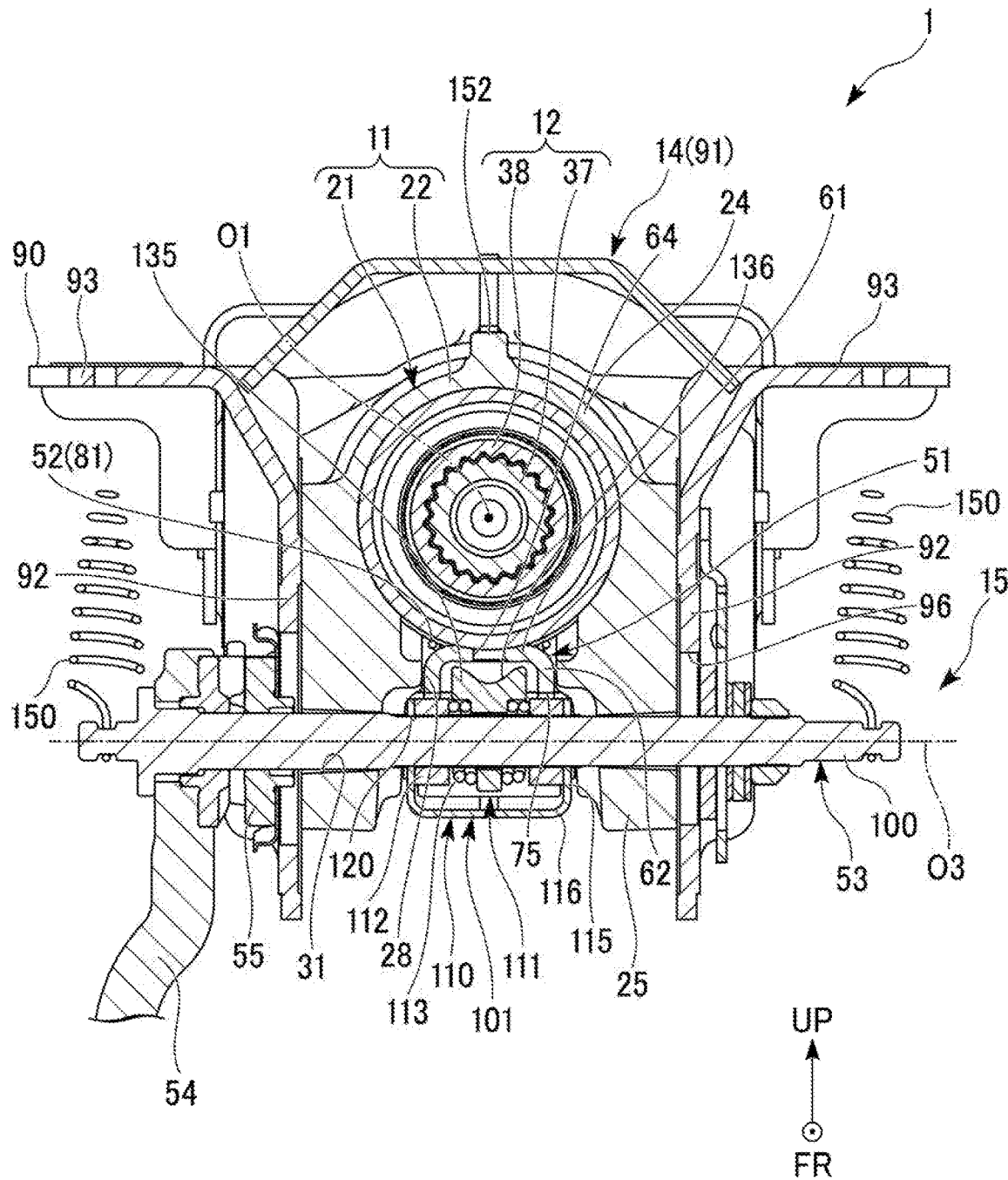
FIG. 3 is a sectional view taken along line in FIG. 1.

FIG. 3 is a sectional view taken along line in FIG. 1.

As shown in FIG. 3, the fastened portions 25 extend downward from positions on the tubular holding portion 24, the positions facing each other in the lateral direction with the slit 28 interposed therebetween. Each fastened portion 25 is formed with a through-hole 31 that penetrates the fastened portion 25 in the lateral direction.

As shown in FIG. 2, the inner column 22 is formed in a tubular shape extending along the axis O1. The outer diameter of the inner column 22 is smaller than the inner diameter of the tubular holding portion 24. The inner column 22 is inserted into the tubular holding portion 24. The inner column 22 is configured to be able to move in the shaft axial direction with respect to the tubular holding portion 24. An outer ring of a rear side bearing 32 is fitted into (press-fitted into) an inner rear end portion of the inner column 22. An outer ring of an intermediate bearing 34 is fitted into (press-fitted into) an inner front end portion of the inner column 22.

Figure 4:
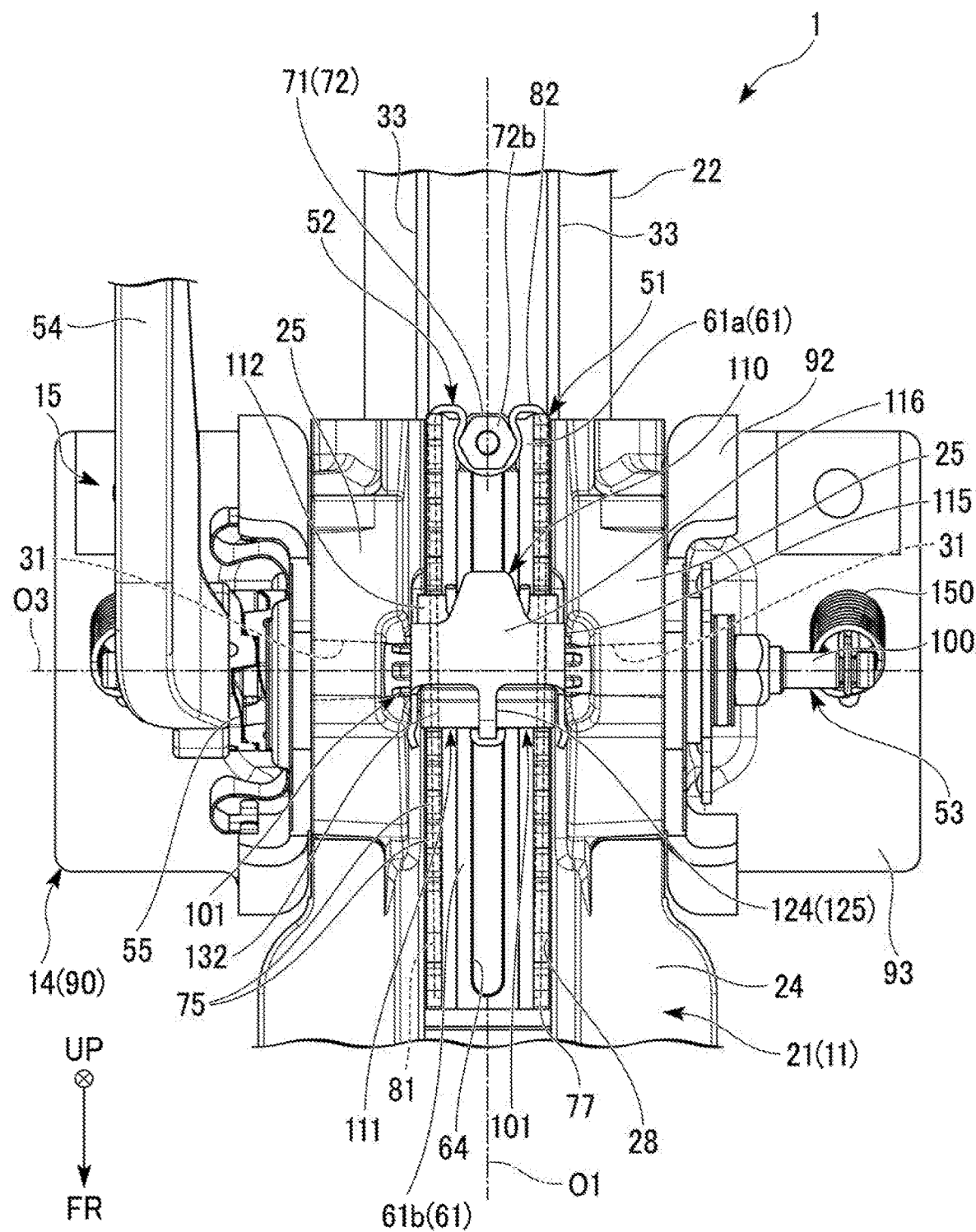
FIG. 4 is a bottom view of the steering device.

FIG. 4 is a bottom view of the steering device 1.

As shown in FIG. 4, a portion of a rear part of the inner column 22 in the shaft circumferential direction (in present embodiment, lower portion) is formed with a pair of guide portions 33. The guide portions 33 face each other in the lateral direction and each guide portion 33 is formed in a rail-like shape extending in the shaft axial direction (front-rear direction).

<Steering Shaft>

As shown in FIG. 2, the steering shaft 12 is provided with an inner shaft 37 and an outer shaft 38.

The inner shaft 37 is formed in a hollow cylindrical shape extending along the axis O1. The inner shaft 37 is inserted into the tubular holding portion 24 with a gap provided therebetween. A front end portion of the inner shaft 37 is press-fitted into an inner ring of the above-described front side bearing 27. Therefore, the inner shaft 37 is supported in the tubular holding portion 24 via the front side bearing 27 such that the inner shaft 37 can rotate around the axis O1. The front end portion of the inner shaft 37 (portion that protrudes up to position ahead of front side bearing 27) is connected to, for example, a lower shaft (not shown), a steering gear box (not shown), or the like via a universal joint (not shown) or the like.

The outer shaft 38 extends in the shaft axial direction. The outer shaft 38 is configured to be able to move in the shaft axial direction with respect to the inner shaft 37 in accordance with movement of the inner column 22 in the shaft axial direction with respect to the outer column 21. An inner circumferential surface of the outer shaft 38 is formed with, for example, a female spline. A male spline formed on an outer circumferential surface of the inner shaft 37 is engaged with the female spline. Accordingly, the outer shaft 38 moves in the shaft axial direction with respect to the inner shaft 37 with the outer shaft 38 restricted from rotating with respect to the inner shaft 37. The expansion and contraction structure of the steering shaft 12 can be appropriately changed.

A rear end portion of the outer shaft 38 is press-fitted into an inner ring of the rear side bearing 32 in the inner column 22. A front end portion of the outer shaft 38 is press-fitted into an inner ring of the intermediate bearing 34 in the inner column 22. In this manner, the outer shaft 38 is configured to be able to rotate around the axis O1 with respect to the inner column 22. A portion of the outer shaft 38 that protrudes up to a position behind the inner column 22 is connected with the steering wheel 2. In the present embodiment, a configuration in which the outer shaft 38 is disposed behind the inner shaft 37 has been described. However, the invention is not limited to the above-described configuration and a configuration in which the outer shaft 38 is disposed ahead of the inner shaft 37 may also be adopted.

<Hanger Bracket>

As shown in FIGS. 2 and 3, a hanger bracket 51 is fixed to a lower portion of the inner column 22 such that the hanger bracket 51 faces a lower side. The hanger bracket 51 is formed through press working of a metal plate, for example. The hanger bracket 51 is exposed to the outside of the tubular holding portion 24 through the slit 28 of the tubular holding portion 24. The hanger bracket 51 is formed in a U-shape that is open to the lower side in a front view as seen in the shaft axial direction.

Figure 5:
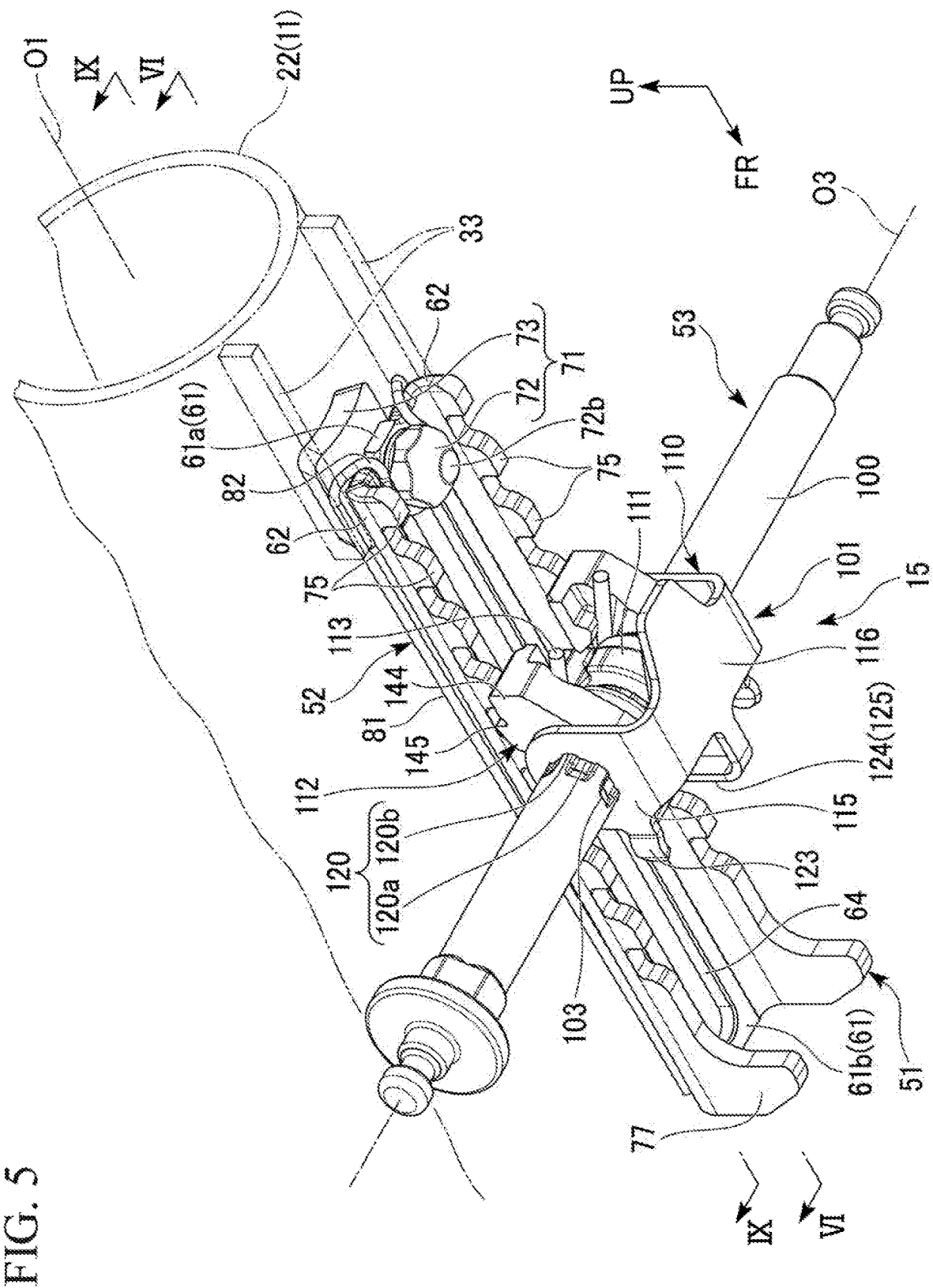
FIG. 5 is an enlarged perspective view of a hanger bracket and a lock mechanism.

FIG. 5 is an enlarged perspective view of the hanger bracket 51 and a lock mechanism 53.

As shown in FIG. 5, the hanger bracket 51 is provided with a top plate portion 61 and a pair of side plate portions 62, the side plate portions 62 extending downward from opposite end portions of the top plate portion 61 in the lateral direction.

The top plate portion 61 is provided with a thick portion 61a that is positioned on a rear end portion side and a thin portion 61b that is aligned with the thick portion 61a while being positioned ahead of the thick portion 61a. The thick portion 61a and the thin portion 61b may be aligned with each other via a level difference or may be smoothly aligned with each other via an inclined surface or the like. A central portion of the top plate portion 61 in the lateral direction is formed with an EA elongated hole (guide hole) 64 that penetrates the top plate portion 61 in the vertical direction. The EA elongated hole 64 linearly extends over the thick portion 61a and the thin portion 61b in the shaft axial direction.

The hanger bracket 51 is fixed to the inner column 22 by means of a fixation member (telescopic restricting portion) 71.

Specifically, a bolt 72 of the fixation member 71 is inserted into a rear end portion of the EA elongated hole 64 from below. The fixation member 71 has a function as a telescopic restricting portion. The fixation member 71 restricts the inner column 22 from moving forward with respect to the outer column 21 at the time of a telescopic motion. An axial portion 72a of the bolt 72 penetrates an insertion hole 22a (refer to FIG. 6) formed in the lower portion of the inner column 22 in the vertical direction. In the present embodiment, the inner diameter of the insertion hole 22a is larger than the outer diameter of the axial portion 72a. Specifically, a gap is provided between an outer circumferential surface of the axial portion 72a and an inner circumferential surface of the insertion hole 22a. In an example shown in the drawing, a head portion 72b of the bolt 72 is provided with a tapered portion of which the diameter gradually decreases toward a base end portion (lower end portion) of the bolt 72.

A tip end portion (upper end portion) of the axial portion 72a is screwed into a nut 73 of the fixation member 71 in the inner column 22. That is, the hanger bracket 51 is fixed to the inner column 22 with the top plate portion 61 (thick portion 61a) and the inner column 22 interposed between the head portion 72b of the bolt 72 and the nut 73 in the vertical direction. Note that, a method of fixing the hanger bracket 51 can be appropriately changed. For example, the hanger bracket 51 may be fixed to the inner column 22 with a rivet or the like.

The hanger bracket 51 is fixed to the inner column 22 in a state where a rear end portion of the top plate portion 61 is disposed inward of the guide portions 33. It is sufficient that at least a portion of the hanger bracket 51 is disposed inward of the guide portions 33.

Figure 6:
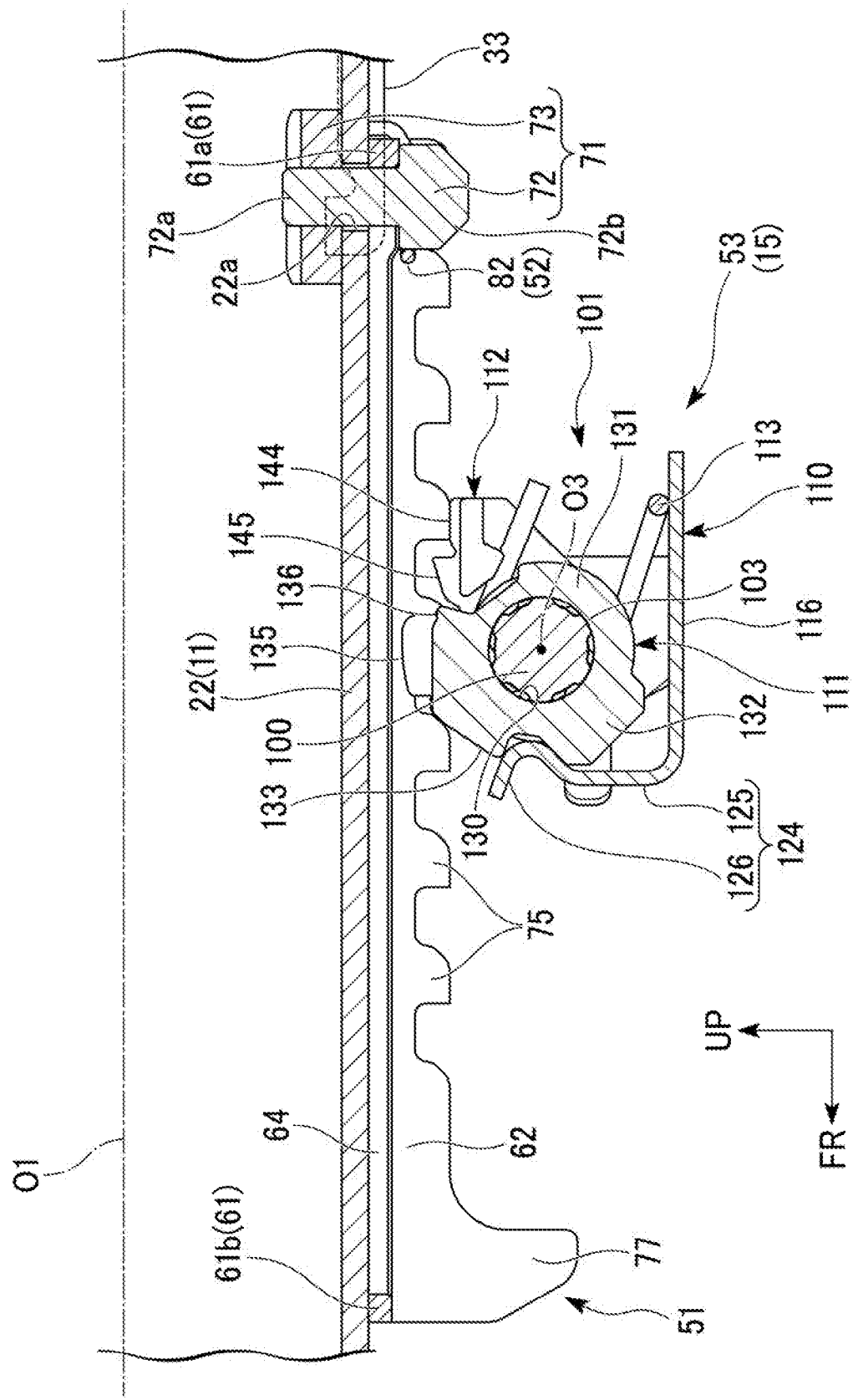
FIG. 6 is a sectional view taken along line VI-VI in FIG. 5.

FIG. 6 is a sectional view taken along line VI-VI in FIG. 5.

As shown in FIG. 6, each side plate portion 62 is formed over the entire length of the top plate portion 61. A portion of the side plate portion 62 other than a front end portion is formed with telescopic lock teeth (telescopic engagement portion) 75 that protrude downward. Each of the telescopic lock teeth 75 is formed in a trapezoidal shape in a side view as seen in the lateral direction. Specifically, a rear surface of the telescopic lock tooth 75 is an inclined surface that extends to become closer to the lower side toward a front side from the rear side. A lower surface of the telescopic lock tooth 75 is a flat surface that linearly extends in the shaft axial direction. A front surface of the telescopic lock tooth 75 is a flat surface that linearly extends in the vertical direction. The shape of each surface of the telescopic lock tooth 75 can be appropriately changed.

A plurality of the telescopic lock teeth 75 are formed at intervals in the shaft axial direction. In the present embodiment, the telescopic lock teeth 75 formed on the respective side plate portions 62, which correspond to each other, are formed at the same positions (at same pitches) in the shaft axial direction. The number of telescopic lock teeth 75 or the pitches at which the telescopic lock teeth 75 are formed can be appropriately changed. The pitches at which the telescopic lock teeth 75 are formed may be different between the right side plate portion 62 and the left side plate portion 62.

A front end portion of each side plate portion 62 is formed with a front side telescopic restricting portion (telescopic restricting portion) 77. The front side telescopic restricting portion 77 restricts the inner column 22 from moving rearward with respect to the outer column 21 at the time of the telescopic motion. The front side telescopic restricting portion 77 is formed in a trapezoidal shape of which the width in the shaft axial direction gradually decreases toward the lower side. The height of the front side telescopic restricting portion 77 in the vertical direction is greater than that of the telescopic lock tooth 75. A rear surface of the front side telescopic restricting portion 77 is formed into a flat surface that linearly extends in the vertical direction. A front surface of the front side telescopic restricting portion 77 is an inclined surface that extends to become closer to the rear side toward the lower side.

<EA Wire>

As shown in FIGS. 4 and 5, an energy absorbing (EA) wire 52 is interposed between the hanger bracket 51 and the fixation member 71. The EA wire 52 is formed in an M-shape in a plan view as seen in the vertical direction. Specifically, the EA wire 52 is provided with a pair of leg portions 81 and a connection portion 82 that connects the pair of leg portions 81 to each other.

The leg portion 81 extends in the shaft axial direction. In the present embodiment, the leg portion 81 is inclined to become closer to an inner side in the lateral direction toward the front side. The leg portion 81 is disposed between the guide portion 33 and the top plate portion 61 at each of opposite end portions of the top plate portion 61 in the lateral direction.

The connection portion 82 is routed around a front side of the head portion 72b of the bolt 72 and then is connected to a rear end portion of each leg portion 81 at a rear side of the hanger bracket 51. Note that, the wire diameter of the EA wire 52 can be appropriately changed according to a necessary bending load or the like.

Here, as shown in FIG. 1, the front bracket 13 described above connects the outer column 21 and the vehicle body to each other via a pivot shaft 86. The front bracket 13 is formed in a U-shape that is open to the lower side in a front view as seen in the shaft axial direction. The front bracket 13 surrounds a front end portion of the outer column 21 from above and opposite sides in the lateral direction. Front side walls 13a of the front bracket 13 that are positioned on opposite sides in the lateral direction are connected to the outer column 21 via the pivot shaft 86. Accordingly, the outer column 21 is supported by the front bracket 13 such that the outer column 21 can rotate around an axis (second axis) O2 of the pivot shaft 86 that extends in the lateral direction.

As shown in FIG. 3, the rear bracket 14 connects the outer column 21, the hanger bracket 51, and the vehicle body to each other via a lock bolt 100 of the lock mechanism 53, which will be described later. The rear bracket 14 is formed in a U-shape that is open to the lower side in a front view as seen in the shaft axial direction. The rear bracket 14 surrounds an upper side of the outer column 21 and opposite sides of the outer column 21 in the lateral direction.

Specifically, the rear bracket 14 is provided with side plate portions 90 disposed on right and left sides of the column unit 11 and a bridge portion 91 that connects the side plate portions 90 to each other.

The side plate portion 90 is formed in an L-shape in a front view as seen in the shaft axial direction. The side plate portion 90 is provided with a rear side wall 92 that extends in the vertical direction and a projecting portion 93 that projects outward in the lateral direction from an upper end portion of the rear side wall 92.

Each rear side wall 92 is formed with a tilting guide hole 96 that penetrates the rear side wall 92 in the lateral direction. The tilting guide hole 96 is an elongated hole that extends to become closer to the rear side toward the upper side. Specifically, the tilting guide hole 96 is formed in an arc shape that protrudes rearward.

The projecting portions 93 are connected to the vehicle body.

The bridge portion 91 is connected to the upper end portion of each rear side wall 92. The bridge portion 91 is formed in an arch shape that protrudes upward. The bridge portion 91 restricts the column unit 11 from rising when the column unit 11 performs a tilting motion (angle adjustment of column unit 11 around axis O2).

<Switching Unit>

As shown in FIG. 4, the switching unit 15 is mainly provided with the lock mechanism 53, an operation lever 54, and a fastening cam 55.

<Lock Mechanism>

Figure 7:
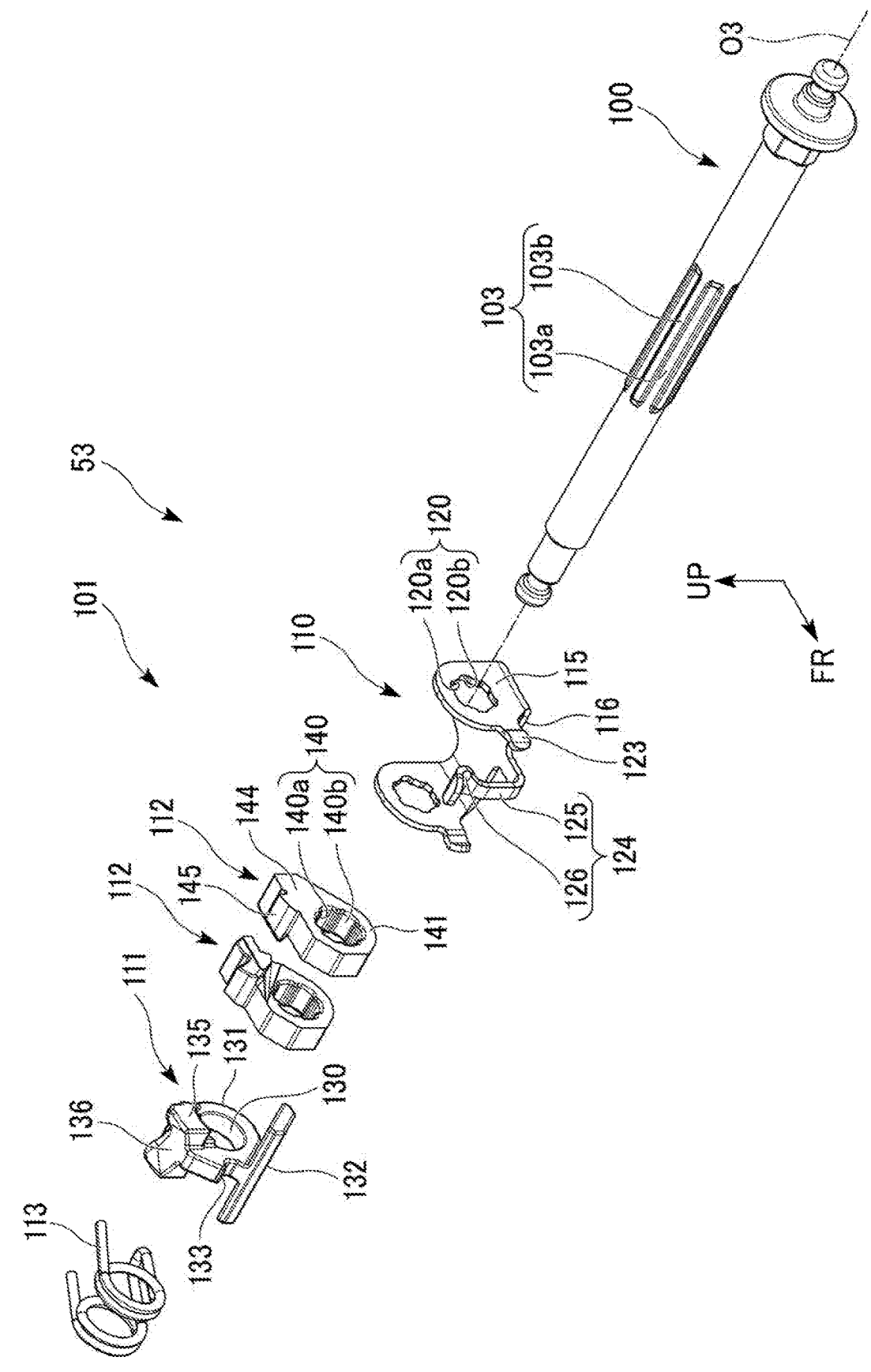
FIG. 7 is an exploded perspective view of the lock mechanism.

FIG. 7 is an exploded perspective view of the lock mechanism 53.

As shown in FIG. 7, the lock mechanism 53 is mainly provided with the lock bolt 100 and a stopper unit 101 that is attached to the lock bolt 100.

As shown in FIG. 3, the lock bolt 100 is formed to have a diameter smaller than that of the through-hole 31 formed in each fastened portion 25. The lock bolt 100 penetrates the fastened portions 25 and the rear bracket 14 in the lateral direction through the through-hole 31 of each fastened portion 25 and the tilting guide holes 96 of the rear bracket 14. In the following description, a direction in which an axis O3 of the lock bolt 100 extends will be simply referred to as a bolt axial direction (lateral direction), a direction orthogonal to the axis O3 will be referred to as a bolt radial direction, and a direction around the axis O3 will be referred to as a bolt circumferential direction, in some cases.

As shown in FIG. 7, an intermediate portion of the lock bolt 100 in the lateral direction is formed with a bolt engagement portion 103. The bolt engagement portion 103 is configured with bolt recess portions 103a and bolt protruding portions 103b alternately disposed.

The bolt recess portion 103a is recessed inward in the bolt radial direction with respect to an outer circumferential surface of the lock bolt 100 and extends in the bolt axial direction. A plurality of the bolt recess portions 103a are formed at intervals in the bolt circumferential direction over the entire circumference of the lock bolt 100. That is, regarding the lock bolt 100, the bolt protruding portion 103b that projects outward in the bolt radial direction with respect to the bolt recess portions 103a is formed between the bolt recess portions 103a that are adjacent to each other in the bolt circumferential direction. It is sufficient that the bolt engagement portion 103 is provided with at least one bolt recess portion 103a (bolt protruding portion 103b). The bolt protruding portion 103b may be formed to protrude outward in the bolt radial direction with respect to the outer circumferential surface of the lock bolt 100.

The stopper unit 101 is mainly provided with a holder 110, a telescopic stopper 111, EA stoppers 112, and a first urging member 113.

The holder 110 is formed through press working of a metal plate, for example. The holder 110 is formed in a U-shape that is open to the upper side in a front view. Specifically, the holder 110 is provided with a pair of holder side walls 115 facing each other in the lateral direction and a bottom wall 116 that connects lower ends of the holder side walls 115 to each other.

Each holder side wall 115 is formed with a holder insertion hole 120 that penetrates the holder side wall 115 in the lateral direction. The bolt engagement portion 103 of the lock bolt 100 is inserted into the holder insertion holes 120. The shape of each holder insertion hole 120 is the same as that of the bolt engagement portion 103 in a side view as seen in the lateral direction. That is, an inner circumferential surface of each holder insertion hole 120 is formed with holder protruding portions 120a that project radially inward. Each holder protruding portion 120a is fitted into each bolt recess portion 103a in a state where the lock bolt 100 is inserted into the holder insertion hole 120. Meanwhile, a portion that is positioned between the holder protruding portions 120a that are adjacent to each other in the bolt circumferential direction constitutes a holder recess portion 120b that is recessed outward in the bolt radial direction with respect to the holder protruding portions 120a. Each bolt protruding portion 103b is fitted into each holder recess portion 120b in a state where the lock bolt 100 is inserted into the holder insertion hole 120.

The width of the holder recess portion 120b (with in bolt circumferential direction) is set to be the same as that of the bolt protruding portion 103b. The width of the holder protruding portion 120a is set to be the same as that of the bolt recess portion 103a. Therefore, the holder 110 is engaged with the lock bolt 100 in the bolt circumferential direction. In the present embodiment, the holder 110 integrally rotates with the lock bolt 100. It is at least one pair of a pair of sufficient that the widths of the holder recess portion 120b and the bolt protruding portion 103b and a pair of the widths of the holder protruding portion 120a and the bolt recess portion 103a are the same as each other. The number of holder protruding portions 120a (holder recess portions 120b) and the number of bolt recess portions 103a (bolt protruding portions 103b) may not be the same as each other.

An intermediate portion of each holder side wall 115 in the vertical direction is formed with a curved claw 123. The curved claw 123 extends forward from each holder side wall 115 and then is curved inward in the lateral direction.

An intermediate portion in the lateral direction of a front edge of the bottom wall 116 is formed with a deformation portion 124. The deformation portion 124 is formed in an L-shape in a side view as seen in the lateral direction. Specifically, the deformation portion 124 is provided with a tongue piece portion 125 and a holding portion 126 that is aligned with a tip end of the tongue piece portion 125.

The tongue piece portion 125 is formed in a thin plate-like shape of which the width is smaller than the width (width in lateral direction) of the bottom wall 116. The tongue piece portion 125 extends forward from the front edge of the bottom wall 116 and then is curved upward.

As shown in FIGS. 6 and 7, the holding portion 126 is formed to have a width larger than that of the tongue piece portion 125 in a front view as seen in the shaft axial direction. The holding portion 126 has a curved shape that protrudes rearward in a side view as seen in the lateral direction.

The telescopic stopper 111 is rotatably supported by the lock bolt 100 while being disposed inward of the holder 110. As shown in FIG. 6, the telescopic stopper 111 is provided with a telescopic ring 131 that is formed with a telescopic insertion hole 130. The telescopic insertion hole 130 is a circular hole of which the diameter is larger than that of a maximum outer diameter portion (outer circumferential surface of bolt protruding portion 103b) of the bolt engagement portion 103 of the lock bolt 100. The bolt engagement portion 103 of the lock bolt 100 is inserted into the telescopic insertion hole 130.

A portion of the telescopic ring 131 in the bolt circumferential direction is formed with a front side stopper 132. The front side stopper 132 protrudes outward in the bolt radial direction from the telescopic ring 131 and has a plate-like shape of which the width in the lateral direction is larger than that of the telescopic ring 131. At the time of the telescopic motion, the above-described front side telescopic restricting portions 77 abut onto of the front side stopper 132 from the front side at a maximum expansion position of the inner column 22. Therefore, the inner column 22 is restricted from moving rearward with respect to the outer column 21. As shown in FIG. 6, the front side stopper 132 is engaged with the above-described holding portion 126 from a first side (lower side in example shown in drawing) in the bolt circumferential direction.

A portion of the telescopic ring 131 that is positioned closer to a second side (upper side in example shown in drawing) in the bolt circumferential direction than the front side stopper 132 is formed with an engagement claw 133 that protrudes outward in the bolt radial direction. The engagement claw 133 is engaged with the above-described holding portion 126 from the second side in the bolt circumferential direction. In this manner, the front side stopper 132 and the engagement claw 133 are engaged with the holding portion 126 from opposite sides in the bolt circumferential direction and thus the telescopic stopper 111 is restricted from rotating with respect to the lock bolt 100.

A portion of the telescopic ring 131 that is positioned closer to the second side in the bolt circumferential direction than the engagement claw 133 is formed with a rear side stopper 135. The rear side stopper 135 protrudes outward in the bolt radial direction from the telescopic ring 131. The rear side stopper 135 is formed to have a width larger than that of the telescopic ring 131 and is formed to have a width smaller than that of the front side stopper 132. The front side stopper 132 is disposed between the above-described holder side walls 115. The rear side stopper 135 faces the head portion 72b of the bolt 72 in the shaft axial direction. That is, at the time of the telescopic motion, the rear side stopper 135 abuts onto of the head portion 72b of the bolt 72 at a maximum contraction position of the inner column 22. Therefore, the inner column 22 is restricted from moving forward with respect to the outer column 21. In this manner, a stroke (telescopic stroke) at the time of the telescopic motion is set to be a length between the fixation member 71 and the front side telescopic restricting portions 77 in the front-rear direction. The rear side stopper 135 is formed with a bolt receiving portion 136 that is recessed downward. The bolt receiving portion 136 is a portion that abuts onto the head portion 72b (tapered portion) of the bolt 72 at the maximum contraction position of the inner column 22 at the time of the telescopic motion.

As shown in FIG. 7, a pair of the EA stoppers 112 is provided on right and left sides of the telescopic stopper 111 while being positioned inward of the holder 110. The configurations of the EA stoppers 112 are the same as each other. Therefore, the following description will be made by using one EA stopper 112 as an example.

The EA stopper 112 is provided with an EA ring 141 that is formed with an EA insertion hole 140. The bolt engagement portion 103 of the lock bolt 100 is inserted into the EA insertion hole 140 such that the bolt engagement portion 103 can rotate with respect to the EA stopper 112.

Figure 8:
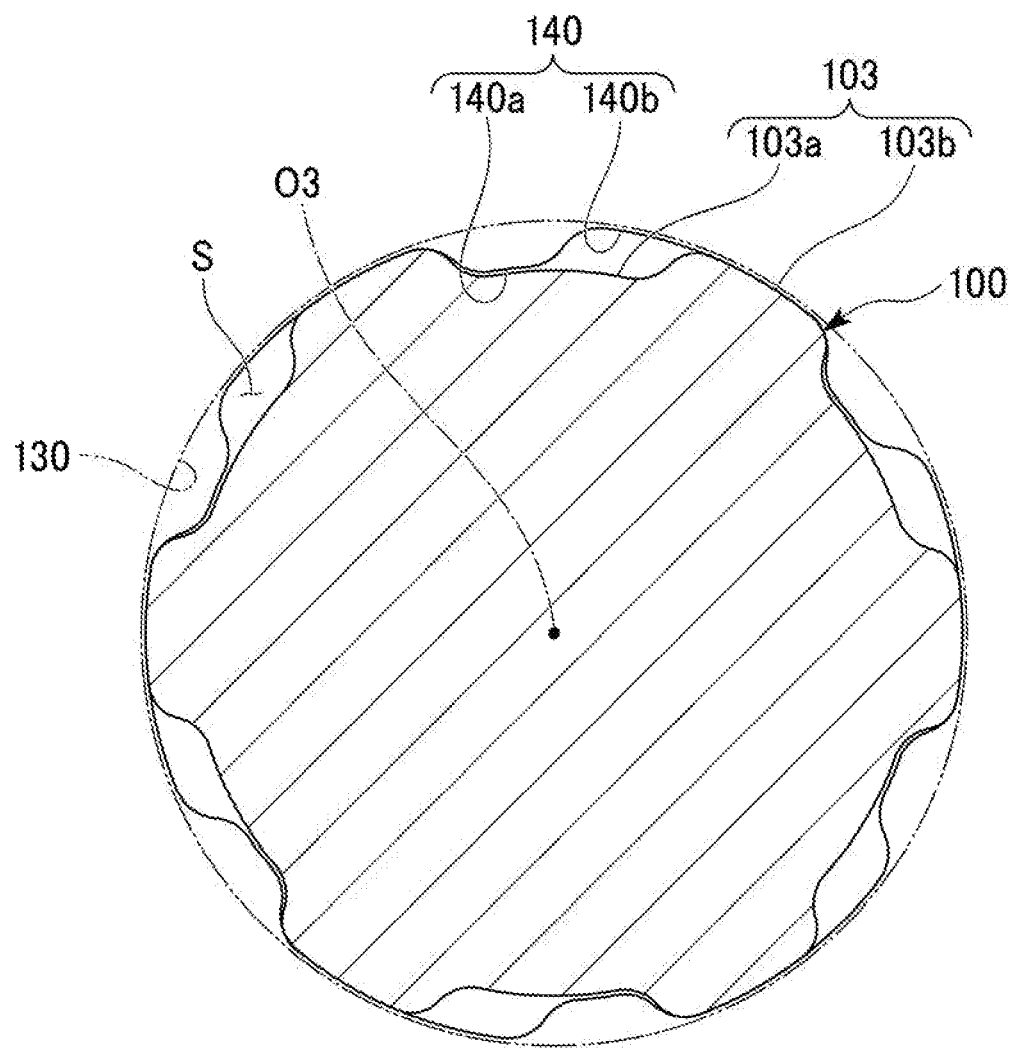
FIG. 8 is a sectional view showing a bolt engagement portion, a telescopic insertion hole, and an EA insertion hole.

FIG. 8 is a sectional view showing the bolt engagement portion 103, the telescopic insertion hole 130, and the EA insertion hole 140.

As shown in FIG. 8, an inner circumferential surface of the EA insertion hole 140 is formed with EA protruding portions 140a that project inward in the bolt radial direction. The width of the EA protruding portions 140a in the bolt circumferential direction is smaller than that of the bolt recess portions 103a. The EA protruding portions 140a are accommodated in the bolt recess portions 103a in a state where the lock bolt 100 is inserted into the EA insertion hole 140.

Meanwhile, a portion that is positioned between the EA protruding portions 140a that are adjacent to each other in the bolt circumferential direction constitutes a EA recess portion 140b that is recessed outward in the bolt radial direction with respect to the EA protruding portions 140a. The width of the EA recess portions 140b in the bolt circumferential direction is larger than that of the bolt protruding portions 103b. The bolt protruding portions 103b are accommodated in the EA recess portions 140b in a state where the lock bolt 100 is inserted into the EA insertion hole 140.

In this manner, the EA protruding portion 140a is accommodated in the bolt recess portion 103a in a state where a gap S in the bolt circumferential direction is provided between the EA protruding portion 140a and the bolt protruding portion 103b that is adjacent to the EA protruding portion 140a in the bolt circumferential direction. That is, the gap S functions as a play when the lock bolt 100 rotates with respect to the EA stoppers 112. Therefore, the lock bolt 100 is configured to be able to rotate with respect to the EA stoppers 112 until the EA protruding portions 140a and the bolt protruding portion 103b abut onto each other in the bolt circumferential direction.

Figure 9:
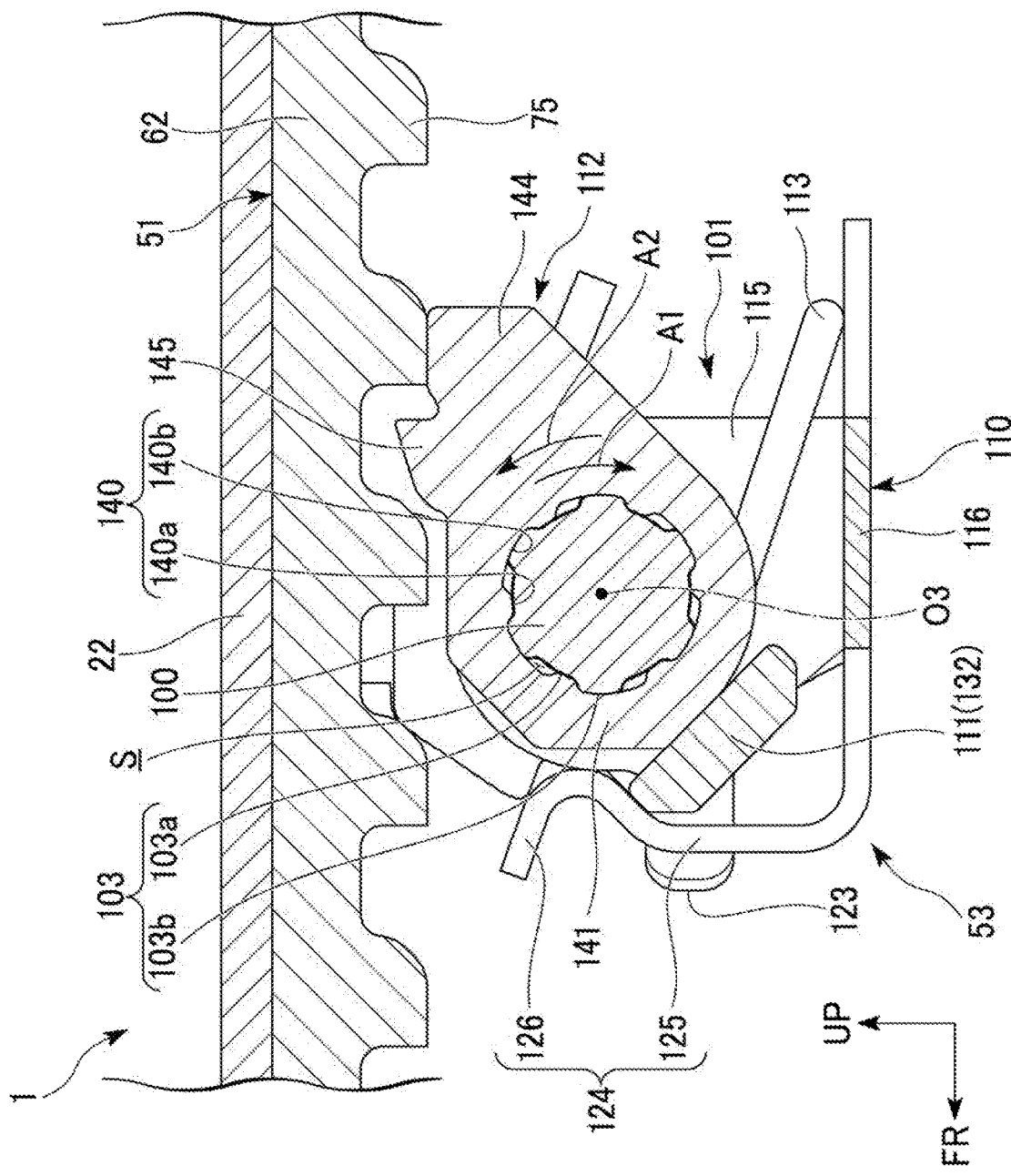
FIG. 9 is a sectional view taken along line IX-IX in FIG. 5, which shows a locked state.

FIG. 9 is a sectional view taken along line IX-IX in FIG. 5.

As shown in FIGS. 5 and 9, a portion of the EA ring 141 in the bolt circumferential direction is formed with an abutting portion 144. The abutting portion 144 protrudes outward in the bolt radial direction from the EA ring 141. The abutting portion 144 is configured to be able to be engaged with the telescopic lock tooth 75 with the EA ring 141 rotating in accordance with rotation of the lock bolt 100. Specifically, the lock mechanism 53 rotates between an abutting position (locked state) and a separating position (unlocked state (refer to FIG. 11)). At the abutting position, the abutting portion 144 abuts onto, for example, a lower surface of the telescopic lock tooth 75 from the lower side. At the separating position, the abutting portion 144 is moved downward to be separated from the lower surface of the telescopic lock tooth 75.

A base end portion of the abutting portion 144 is formed with an EA claw portion 145. The EA claw portion 145 protrudes in a direction that intersects a direction in which the abutting portion 144 extends. At the abutting position, the EA claw portion 145 enters a space between the telescopic lock teeth 75 that are adjacent to each other in the shaft axial direction. The EA claw portion 145 is configured such that the telescopic lock tooth 75 can be engaged with the EA claw portion 145 from the rear side at the abutting position.

The EA claw portion 145 in the present embodiment is formed in a triangular shape in a side view as seen in the lateral direction.

A rear surface of the EA claw portion 145 is formed into a flat surface extending in the vertical direction. A front surface of the EA claw portion 145 is formed into an inclined surface that is inclined to become closer to the front side toward the lower side.

The first urging member 113 is, for example, a double torsion spring. The first urging member 113 is interposed between the bottom wall 116 of the holder 110 and the EA stoppers 112. The first urging member 113 urges the EA stoppers 112 toward the abutting position (in direction in which abutting portion 144 is pressed against telescopic lock tooth 75). Therefore, the above-described EA protruding portions 140a are engaged with the bolt protruding portions 103b in a direction toward the abutting position (direction A2) in the bolt circumferential direction. Therefore, the EA stoppers 112 integrally rotate with the lock bolt 100. The first urging member 113 is not limited to a double torsion spring.

As shown in FIG. 1, the operation lever 54 is connected to a first end portion (in example shown in drawing, left end portion) of the lock bolt 100 in the lateral direction. The operation lever 54 is configured to be able to rotate around the axis O3 along with the lock mechanism 53.

As shown in FIG. 3, the fastening cam 55 is interposed between the operation lever 54 and the rear side wall 92 of the rear bracket 14. The fastening cam 55 is configured such that the thickness thereof in the lateral direction changes as the operation lever 54 rotates. The steering device 1 is configured such that the fastened portions 25 approach each other or the fastened portions 25 are separated from each other in the lateral direction via the rear side walls 92 (width (interval) of slit 28 in lateral direction increases or decreases) when the thickness of the fastening cam 55 changes. Specifically, when the operation lever 54 is rotated such that the thickness of the fastening cam 55 increases, the fastened portions 25 approach each other along with the rear side walls 92 and the diameter of the tubular holding portion 24 decreases. Accordingly, the inner column 22 is clamped by the tubular holding portion 24 and the inner column 22 is restricted from moving in the shaft axial direction with respect to the outer column 21 (locked state). Meanwhile, when the operation lever 54 is rotated such that the thickness of the fastening cam 55 decreases, the fastened portions 25 are separated from each other along with the rear side walls 92 and the diameter of the tubular holding portion 24 increases. Accordingly, the inner column 22 clamped by the tubular holding portion 24 is released. As a result, the inner column 22 is allowed to move in the shaft axial direction with respect to the outer column 21 (unlocked state).

Second urging members (urging members) 150 are interposed between opposite end portions of the above-described lock bolt 100 in the lateral direction and the above-described projecting portions 93 of the rear bracket 14. The second urging members 150 are for achieving a tilt balance. The second urging members 150 are, for example, coil springs. Upper end portions of the second urging members 150 are connected to the projecting portions 93. Lower end portions of the second urging members 150 are connected to the lock bolt 100. The second urging members 150 urge the column unit 11, the steering shaft 12, or the like upward via the lock bolt 100. Therefore, the column unit 11 is prevented from being lowered due to the own weight of the column unit 11 at the time of an unlocking operation.

Figure 10:
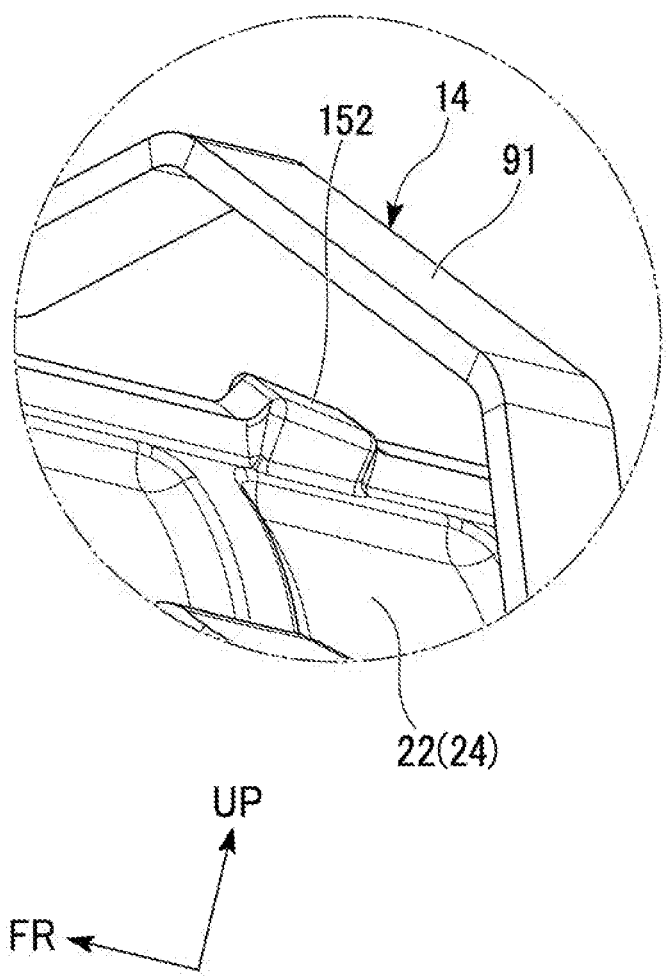
FIG. 10 is an enlarged view of part X in FIG. 1.

FIG. 10 is an enlarged view of part X in FIG. 1.

As shown in FIG. 10, an upper portion of the tubular holding portion 24 of the above-described outer column 21 is formed with a bumping portion 152. The bumping portion 152 projects upward from the tubular holding portion 24. The bumping portion 152 bumps against the bridge portion 91 of the rear bracket 14 from the lower side at an uppermost position of the tilting motion. That is, the dimensions of the bumping portion 152 are set such that the bumping portion 152 bumps against the bridge portion 91 before the lock bolt 100 comes into contact with an upper end inner circumferential edge of the tilting guide hole 96 at the time of the tilting motion.

The bumping portion 152 in the present embodiment is formed in a rectangular parallelepiped-like shape. An upper surface of the bumping portion 152 is an inclined surface that extends to become closer to the lower side toward the rear side. An angle at which the upper surface of the bumping portion 152 is inclined (angle with respect to shaft axial direction) is set such that a lower surface of the bridge portion 91 and the upper surface of the bumping portion 152 become parallel to each other at the uppermost position of the tilting motion. Therefore, the bumping portion 152 and the bridge portion 91 come into surface-contact with each other and thus a surface-pressure at the time of contact between the bumping portion 152 and the bridge portion 91 can be decreased.

Effect

Next, the effect of the above-described steering device 1 will be described. The following description will be made focusing on the tilting motion, the telescopic motion, and a motion at the time of secondary collision. The following description will be made on an assumption that a state in which the EA stopper 112 is at the abutting position as shown in FIG. 9 is an initial state.

<Tilting Motion and Telescopic Motion>

As shown in FIG. 1, in a case where the position of the steering wheel 2 in the front-rear direction or the angle of the steering wheel 2 is adjusted, the operation lever 54 is rotated first such that the steering device 1 enters the unlocked state. Specifically, the operation lever 54 is rotated in a direction (for example, downward direction) in which the thickness of the fastening cam 55 decreases. Then, the fastened portions 25 are separated from each other along with the rear side walls 92 and the diameter of the tubular holding portion 24 (slit 28) increases. Accordingly, the inner column 22 clamped by the tubular holding portion 24 is released and the outer column 21 clamped by the rear side walls 92 is released. As a result, it becomes possible to perform the telescopic motion and the tilting motion.

Figure 11:
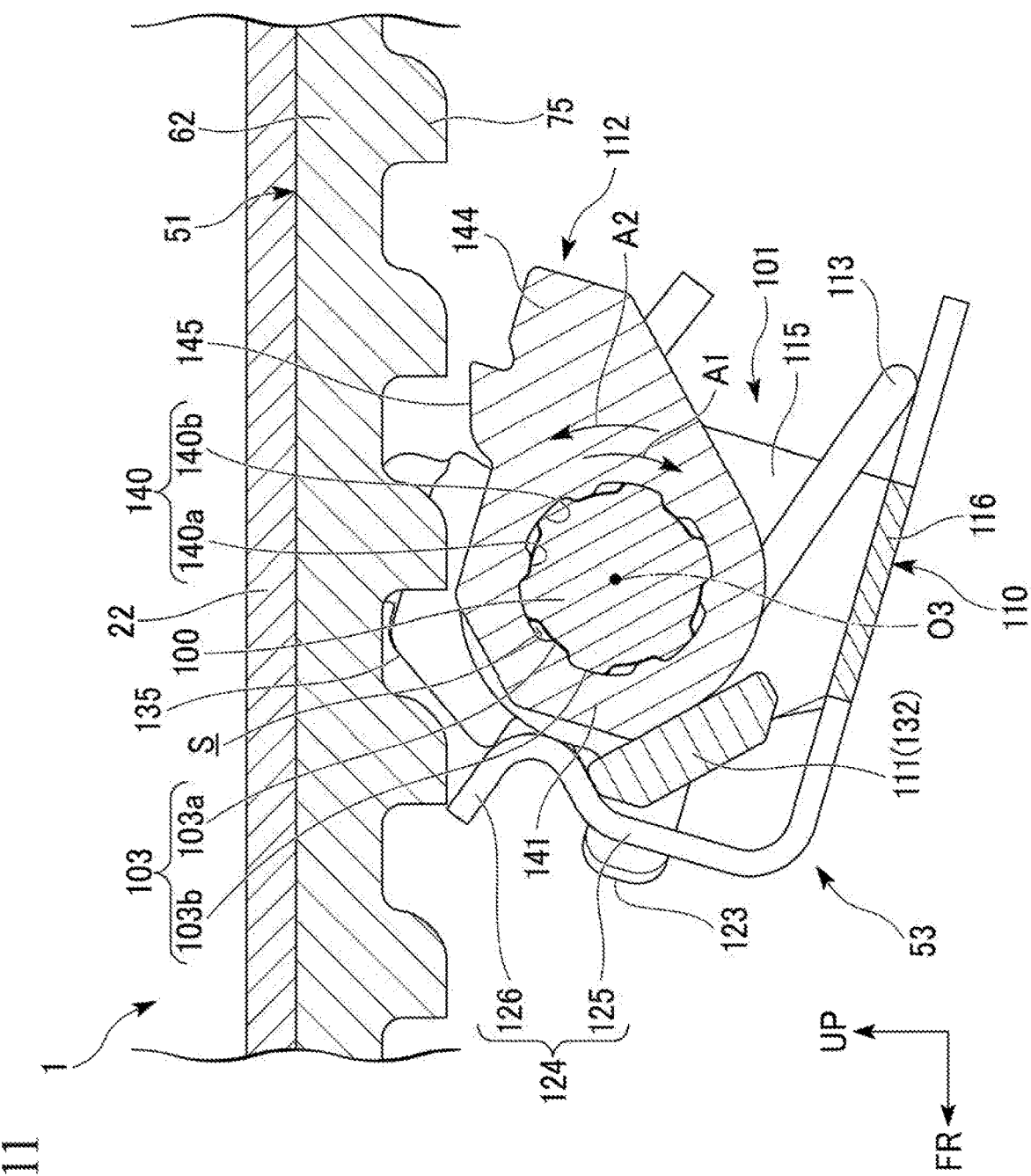
FIG. 11 is a sectional view corresponding to FIG. 9, which shows a state where a stopper unit in an unlocked state is at a separating position.

FIG. 11 is a sectional view corresponding to FIG. 9, which shows a state where the stopper unit 101 is at the separating position.

Here, as described above, the bolt engagement portion 103 of the lock bolt 100 and the holder protruding portions 120a (holder recess portions 120b) of the holder 110 are engaged with each other in the bolt circumferential direction. Therefore, as shown in FIG. 11, in a process in which the operation lever 54 is rotated such that the unlocked state is entered, the holder 110 rotates in a direction A1 around the axis O3 (counter-clockwise direction in FIG. 11) along with the lock bolt 100.

Furthermore, the telescopic stopper 111 is restricted from rotating with respect to the lock bolt 100 since the front side stopper 132 and the engagement claw 133 are engaged with the holding portion 126 of the holder 110 from opposite sides in the bolt circumferential direction. Therefore, the telescopic stopper 111 held by the holder 110 rotates in the direction A1 around the axis O3 along with the lock bolt 100.

Meanwhile, as shown in FIG. 9, the EA stoppers 112 are urged toward the abutting position by the first urging member 113. Therefore, the EA protruding portions 140a of the EA stoppers 112 are engaged with the bolt protruding portions 103b in the direction A2 around the axis O3 (clockwise direction in FIG. 9). Therefore, as shown in FIG. 11, the EA stoppers 112 also rotate in the direction A1 around the axis O3 along with the lock bolt 100 when the operation lever 54 is rotated such that the unlocked state is entered.

As a result, the EA stoppers 112 move to the separating position as the operation lever 54 moves such that the unlocked state is entered.

The steering wheel 2 is pressed forward in the unlocked state. Then, the steering wheel 2 moves forward with respect to the outer column 21 along with the inner column 22 and the steering shaft 12. When the steering wheel 2 is pulled rearward in the unlocked state, the steering wheel 2 moves rearward with respect to the outer column 21 along with the inner column 22 and the steering shaft 12. In this manner, it is possible to adjust the position of the steering wheel 2 in the front-rear direction to a certain position.

In the unlocked state, the front side stopper 132 of the telescopic stopper 111 overlaps the front side telescopic restricting portions 77 in a front view. Therefore, the front side stopper 132 abuts onto the front side telescopic restricting portions 77 at the maximum expansion position of the inner column 22. Accordingly, the inner column 22 is restricted from moving rearward with respect to the outer column 21.

Figure 12:
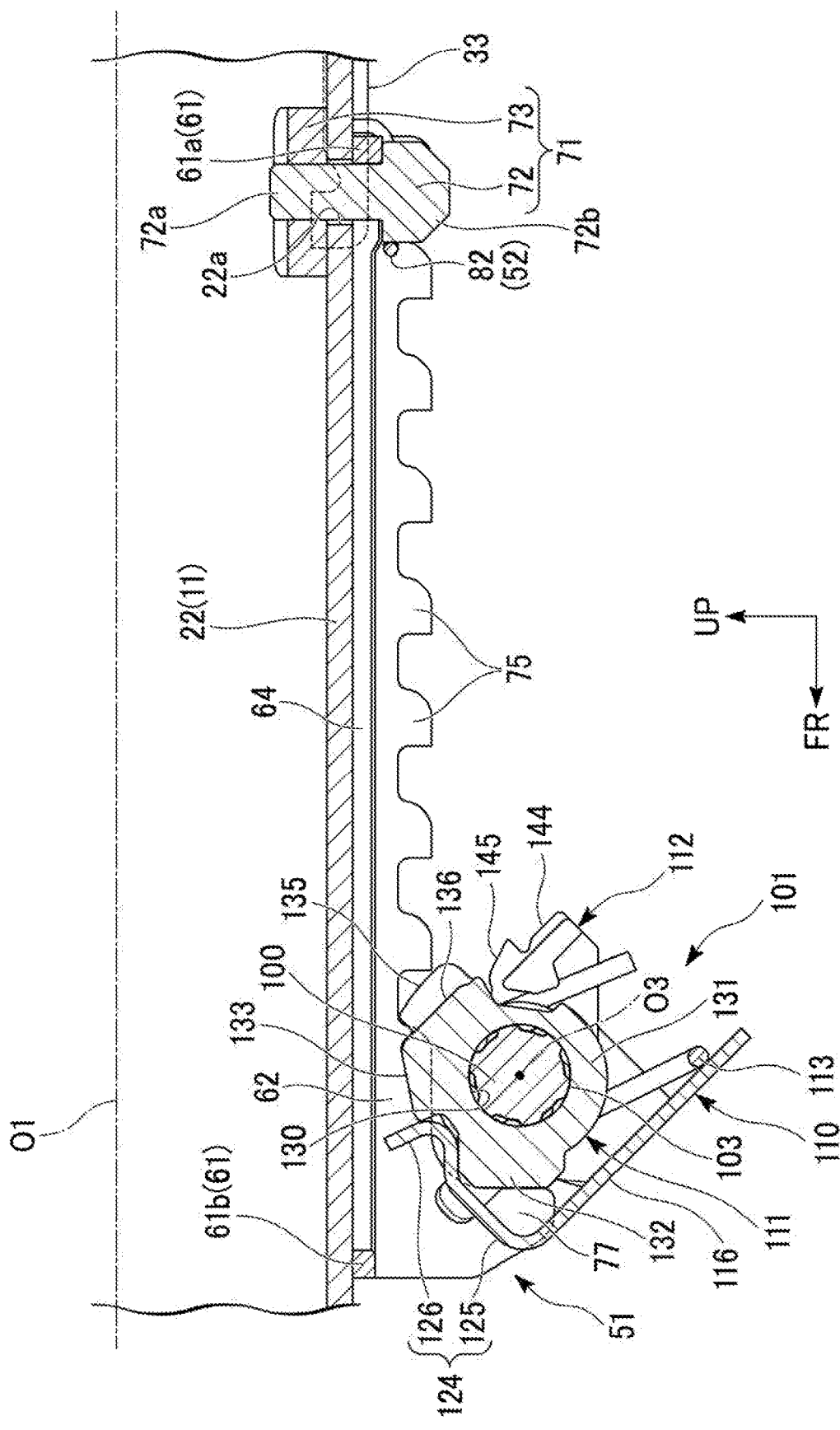
FIG. 12 is a sectional view corresponding to FIG. 6, which shows the unlocked state.

FIG. 12 is a sectional view corresponding to FIG. 6, which shows the unlocked state.

As shown in FIG. 12, when the telescopic stopper 111 rotates in accordance with rotation of the lock bolt 100 at the time of the unlocking operation, the front side stopper 132 and the front side telescopic restricting portions 77 face each other in the front-rear direction. At this time, a surface of the front side stopper 132 that faces the front side and surfaces of the front side telescopic restricting portions 77 that face the rear side (facing surfaces of front side stopper 132 and front side telescopic restricting portions 77) are disposed to be substantially parallel to each other. Therefore, the front side stopper 132 and the front side telescopic restricting portions 77 come into surface-contact with each other when the front side stopper 132 and the front side telescopic restricting portions 77 abut onto each other. As a result, the inner column 22 can be reliably restricted from moving rearward with respect to the outer column 21. Damage to the telescopic stopper 111 that is caused by a load generated at the time of abutting.

Meanwhile, in the unlocked state, the rear side stopper 135 of the telescopic stopper 111 overlaps the head portion 72b of the bolt 72 in a front view. Therefore, the bolt receiving portion 136 of the rear side stopper 135 and the head portion 72b (tapered portion) of the bolt 72 abut onto each other at the maximum contraction position of the inner column 22. Accordingly, the inner column 22 is restricted from moving forward with respect to the outer column 21.

Figure 13:
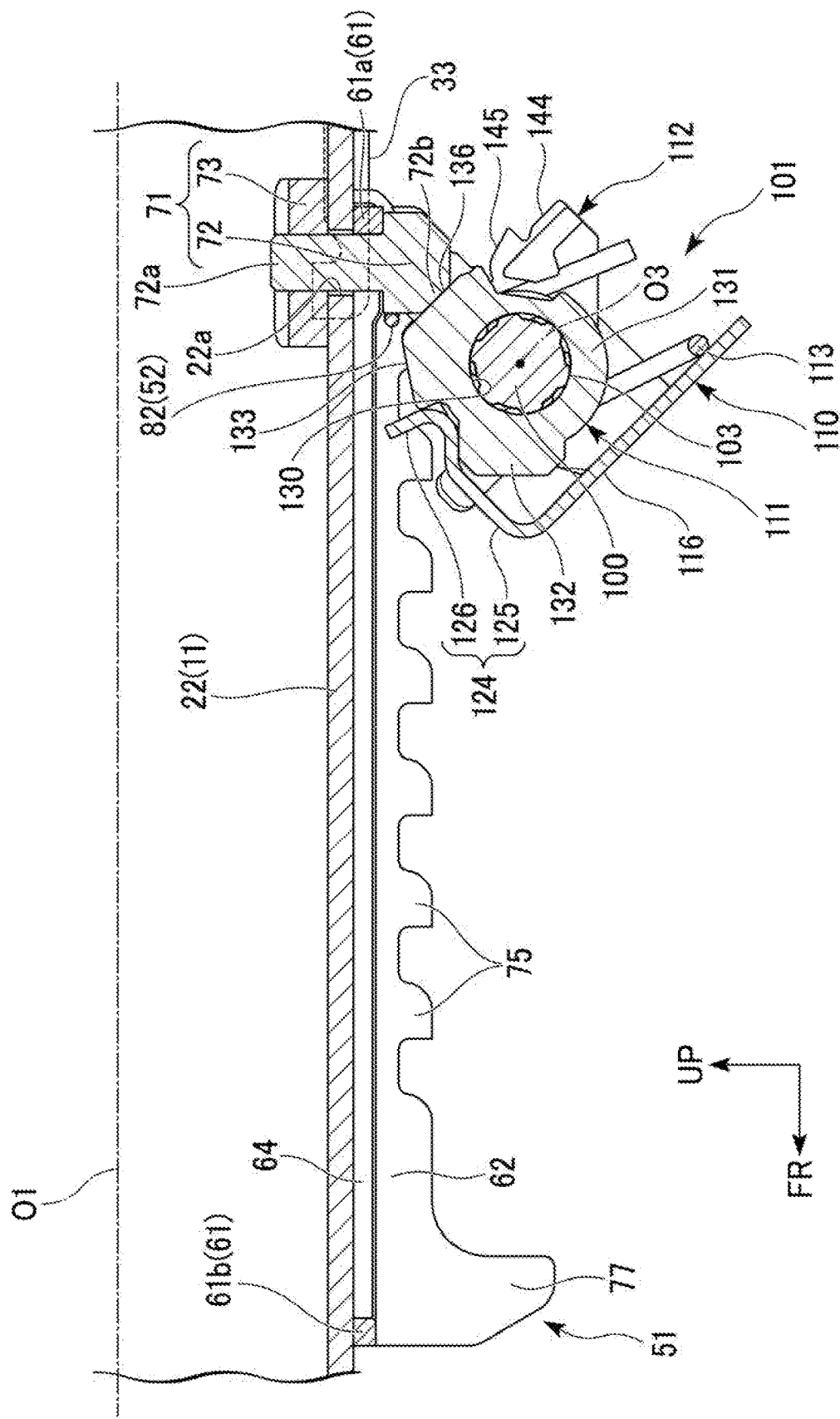
FIG. 13 is a sectional view corresponding to FIG. 6, which shows the unlocked state.

FIG. 13 is a sectional view corresponding to FIG. 6, which shows the unlocked state.

As shown in FIG. 13, when the telescopic stopper 111 rotates in accordance with rotation of the lock bolt 100 at the time of the unlocking operation, the bolt receiving portion 136 is inclined to become closer to the lower side toward the rear side (for example, angle with respect to front-rear direction is approximately 45°). When the inner column 22 is moved forward in this state, the head portion 72b (tapered portion) of the bolt 72 abuts onto the bolt receiving portion 136 of the rear side stopper 135 from a diagonally upper side. Specifically, the bolt receiving portion 136 and the tapered portion of the head portion 72b come into contact (surface-contact) with each other in a state of being inclined with respect to the front-rear direction. Accordingly, it is possible to suppress the telescopic stopper 111 rotating such that the locked state is entered. At this time, a load that acts in a normal direction of the bolt receiving portion 136 between the bolt receiving portion 136 and the head portion 72b is decomposed into a load in a forward direction (locked state) and a load in a downward direction (unlocked state). That is, a component of the load that acts between the bolt receiving portion 136 and the head portion 72b at the time of the telescopic motion can be caused to act in a direction in which the telescopic stopper 111 is rotated such that the unlocked state is entered (direction different from direction for locked state). Therefore, it is possible to reliably restrict the inner column 22 from moving forward with respect to the outer column 21 while suppressing unexpected rotation of the telescopic stopper 111.

When adjusting the angle of the steering wheel 2 in the unlocked state such that the steering wheel 2 faces the upper side, the steering wheel 2 is pressed upward. Then, the steering wheel 2 swings upward around the axis O2 along the tilting guide holes 96, along with the column unit 11 and the steering shaft 12.

Meanwhile, when adjusting the angle of the steering wheel 2 in the unlocked state such that the steering wheel 2 faces the lower side, the steering wheel 2 is pulled down. Then, the steering wheel 2 swings downward around the axis O2 along the tilting guide holes 96, along with the column unit 11 and the steering shaft 12. In this manner, it is possible to adjust the angle of the steering wheel 2 to a certain position.

Figure 14:
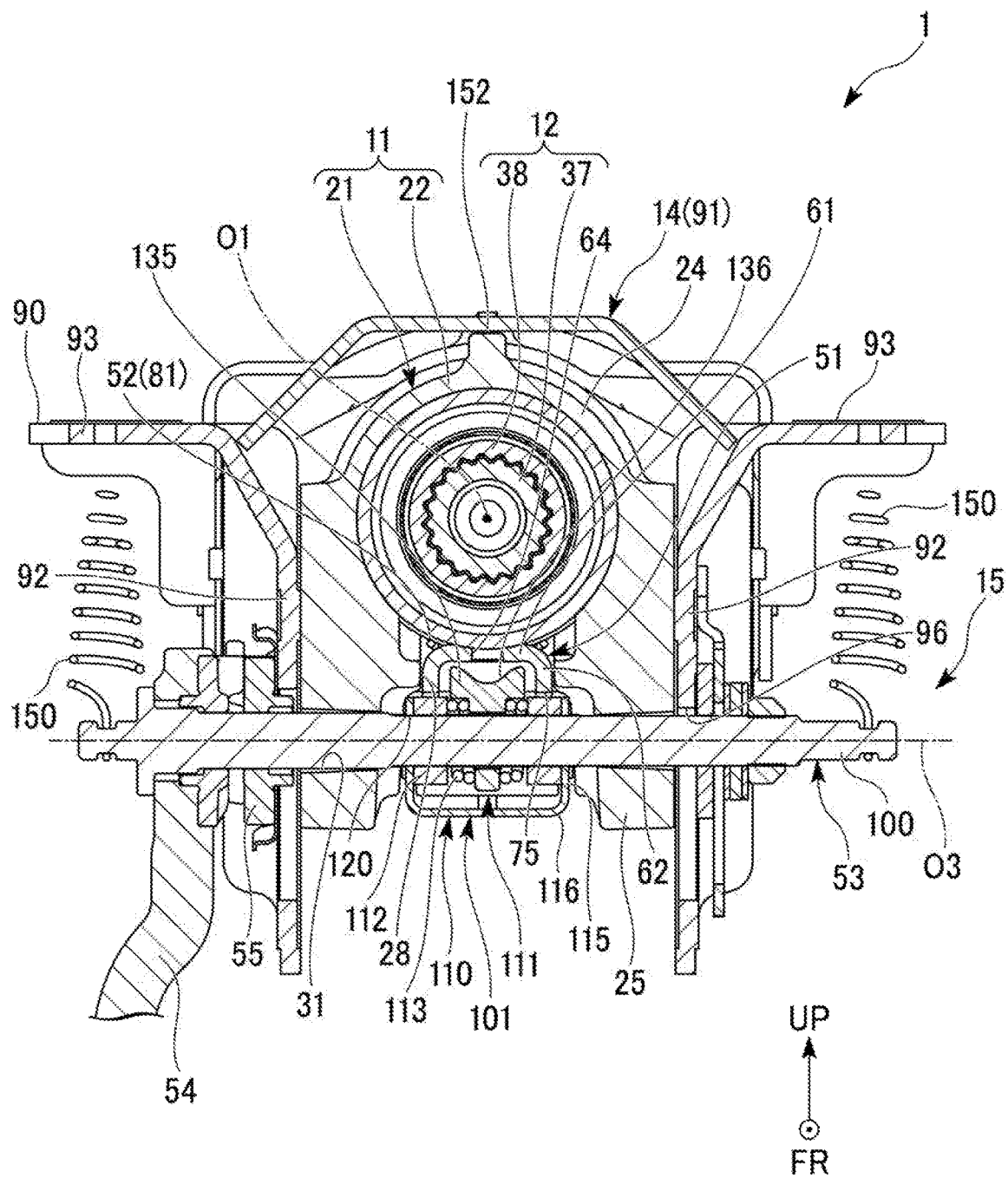
FIG. 14 is a sectional view corresponding to FIG. 3, which shows a state in which a column unit is at an uppermost position.

FIG. 14 is a sectional view corresponding to FIG. 3, which shows a state in which the column unit 11 is at the uppermost position.

As shown in FIG. 14, in a process in which the column unit 11 swings upward, the lock bolt 100 moves upward inside the tilting guide holes 96. At this time, the bumping portion 152 of the outer column 21 abuts onto the bridge portion 91 from the lower side before the lock bolt 100 bumps against the upper end inner circumferential edges of the tilting guide holes 96. Accordingly, the column unit 11 is restricted from swinging upward.

Next, as shown in FIG. 3, after the position of the steering wheel 2 is adjusted to a desired position, the operation lever 54 is rotated such that the steering device 1 enters the locked state. Specifically, the operation lever 54 is rotated in a direction (for example, upward direction) in which the thickness of the fastening cam 55 increases. Then, the fastened portions 25 are approach each other along with the rear side walls 92 and the diameter of the tubular holding portion 24 (slit 28) decreases. Accordingly, the inner column 22 is clamped by the tubular holding portion 24 and the outer column 21 is clamped by the rear side walls 92. As a result, the telescopic motion and the tilting motion are restricted.

As shown in FIGS. 9 and 11, when the operation lever 54 is rotated such that the unlocked state is entered, the holder 110 and the telescopic stopper 111 rotate in the direction A1 around the axis O3 along with the lock bolt 100.

Meanwhile, when the lock bolt 100 is rotated in the direction A2 such that the locked state is entered, the bolt protruding portions 103b move to be separated from the EA protruding portions 140a in the direction A2. However, since the EA stoppers 112 are urged toward the abutting position by the first urging member 113, the EA stoppers 112 are rotated in the direction A2 in accordance with rotation of the lock bolt 100 in the direction A2. Regarding the EA stopper 112, the EA claw portion 145 enters a space between the adjacent telescopic lock teeth 75 and the abutting portion 144 abuts onto a lower surface of the telescopic lock tooth 75 from the lower side. That is, when the operation lever 54 is moved such that the locked state is entered, the EA stoppers 112 move to the abutting position.

Figure 15:
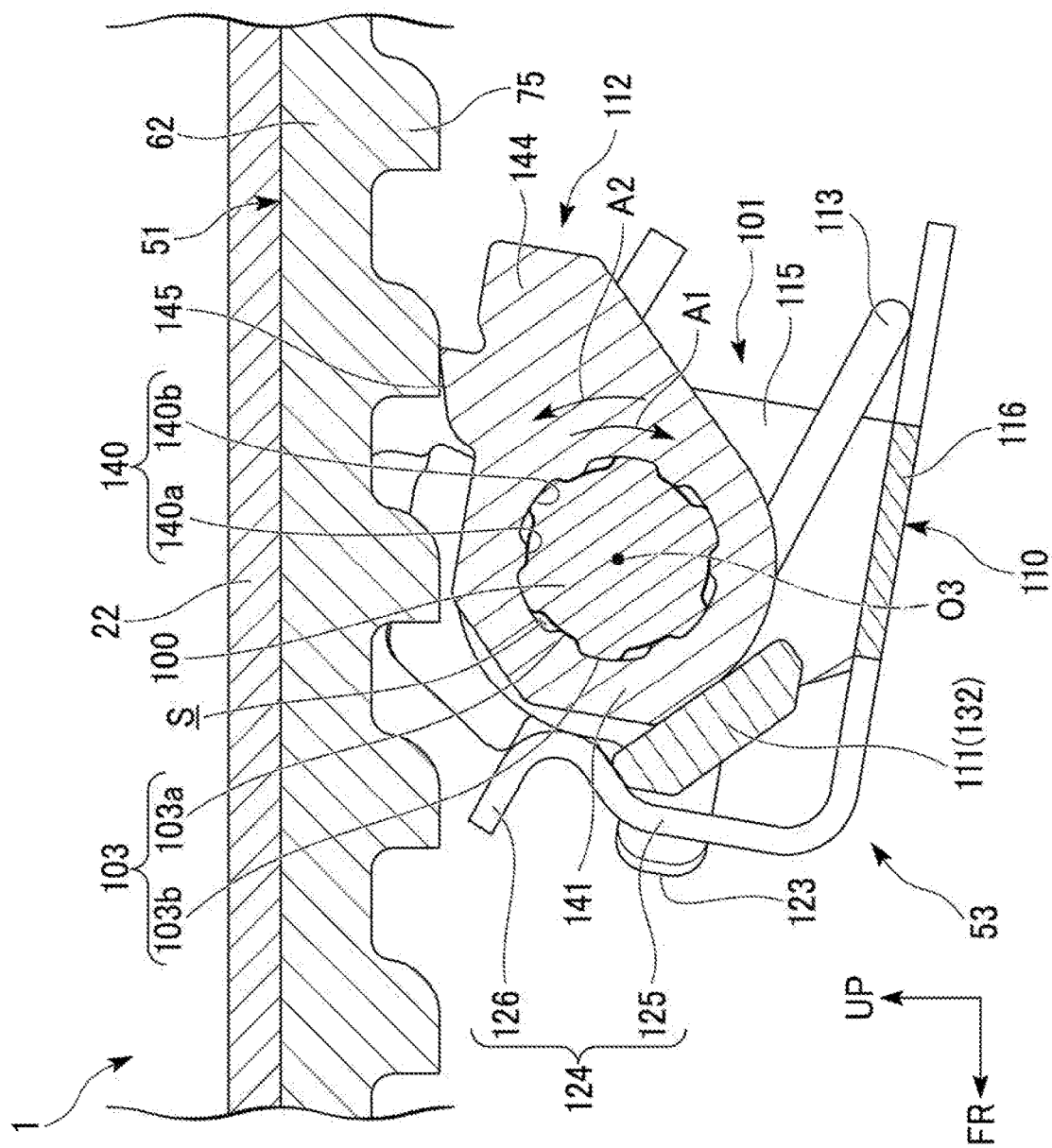
FIG. 15 is a sectional view corresponding to FIG. 9, which shows a state where EA stoppers are at riding-over positions.
Figure 16:
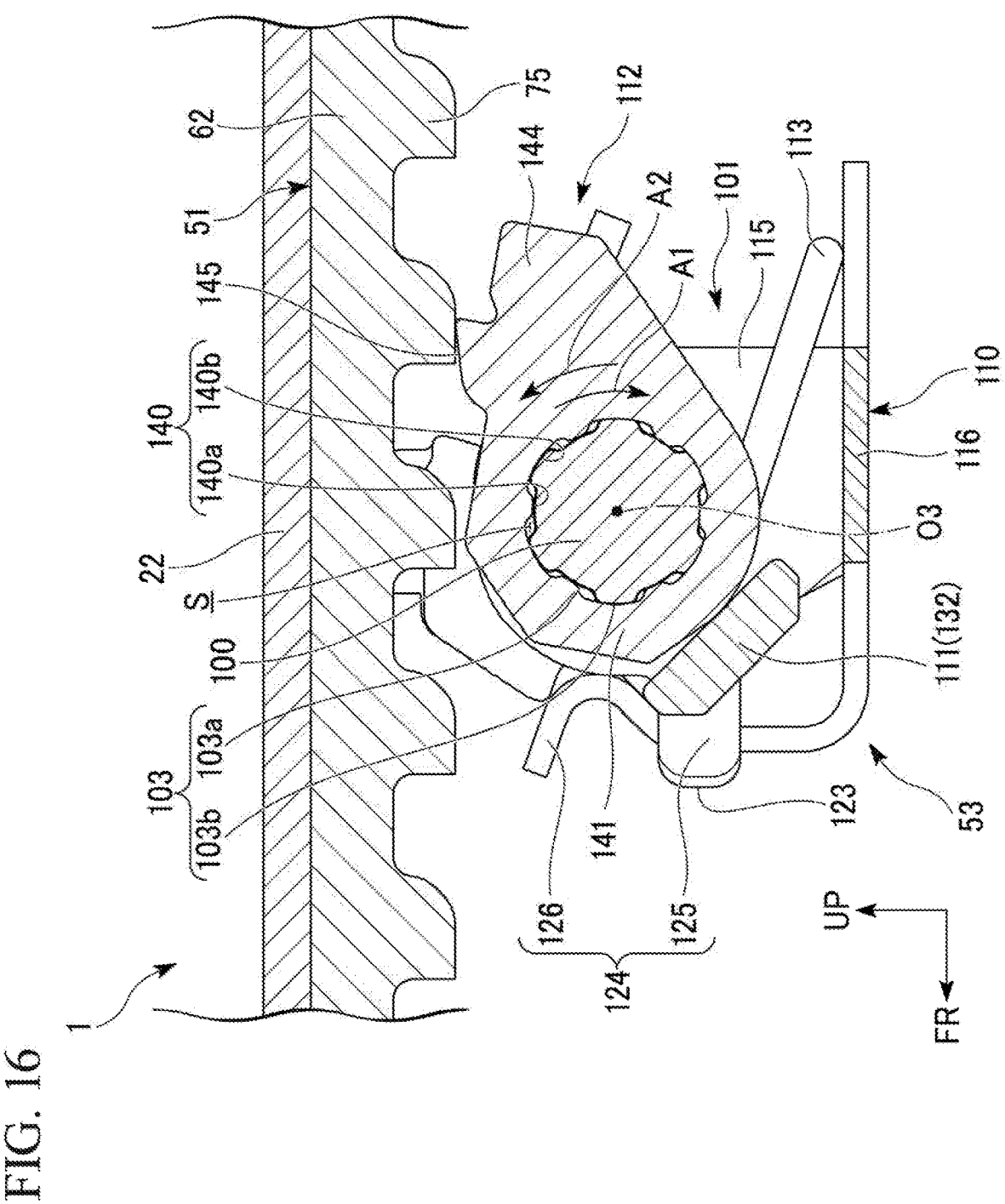
FIG. 16 is a sectional view corresponding to FIG. 9, which shows a state where the EA stoppers are at the riding-over positions.

FIGS. 15 and 16 are sectional view corresponding to FIG. 9, which show a state where the EA stoppers 112 are at riding-over positions.

Here, as shown in FIG. 15, there is a case where the EA claw portions 145 interfere with the telescopic lock teeth 75 during a process in which the EA stoppers 112 are rotated in the direction A2 such that the locked state is entered (riding-over position). With regard to this, in the present embodiment, the EA stoppers 112 are urged in the direction A2 by the first urging member 113. The EA protruding portion 140a is accommodated in the bolt recess portion 103a in a state where the gap S is provided between the EA protruding portion 140a and the bolt protruding portion 103b that is adjacent to the EA protruding portion 140a in the bolt circumferential direction.

Therefore, as shown in FIG. 16, even in a case where the EA stoppers 112 are at the riding-over positions, when the lock bolt 100 (operation lever 54) is rotated in the direction A2, the lock bolt 100 or the like rotate in the direction A2 with respect to the EA stoppers 112. That is, the lock bolt 100 rotates (idles) with respect to the EA stoppers 112 such that the gap S is filled. Accordingly, it is possible to move the operation lever 54 such that the locked state is entered even when the EA stoppers 112 are at the riding-over positions.

<At Time of Secondary Collision>

Next, a motion at the time of the secondary collision will be described.

At the time of the secondary collision, a collision load toward the front side acts on the steering wheel 2 from a driver. In a case where the magnitude of the collision load is equal to or greater than a predetermined level, the steering wheel 2 moves forward with respect to the outer column 21 along with the inner column 22 and the steering shaft 12. Specifically, in the steering device 1, the inner column 22 or the like moves forward with respect to the outer column 21 with an outer circumferential surface of the inner column 22 sliding on an inner circumferential surface of the outer column 21.

Due to a sliding friction between the outer column 21 and the inner column 22, an impact load that is applied to the driver at the time of the secondary collision is alleviated.

Figure 17:
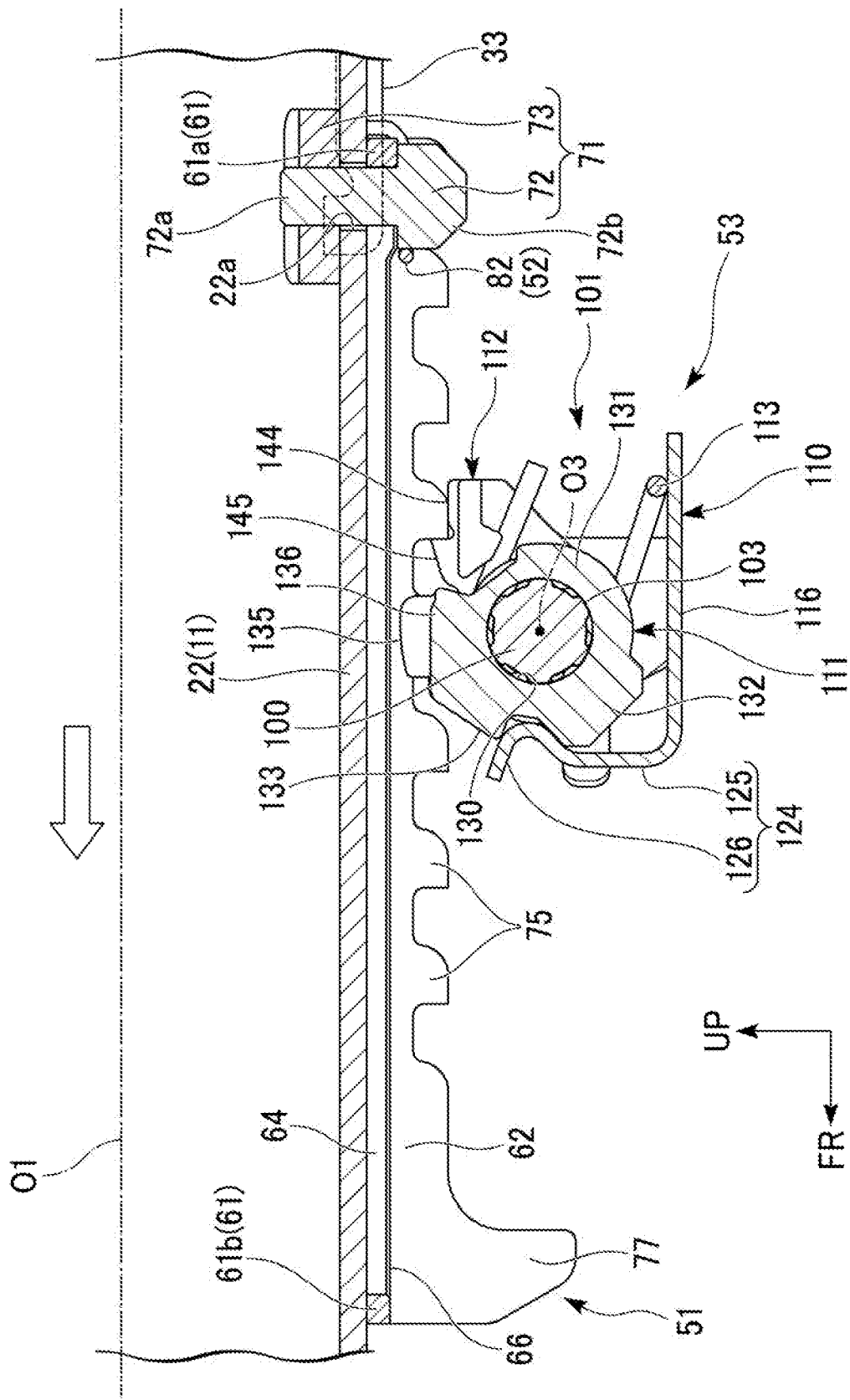
FIG. 17 is an explanatory view showing a motion at the time of a secondary collision and is a sectional view corresponding to FIG. 6.

FIG. 17 is an explanatory view showing a motion at the time of the secondary collision and is a sectional view corresponding to FIG. 6.

Here, as shown in FIG. 17, when the hanger bracket 51 is moved forward along with the inner column 22 in a state where the EA stoppers 112 are at the abutting positions, the telescopic lock teeth 75 and the EA claw portions 145 are engaged with each other in the shaft axial direction. Accordingly, the hanger bracket 51 is restricted from moving forward with respect to the outer column 21. As a result, the inner column 22 moves forward with respect to the hanger bracket 51, the outer column 21, and the lock mechanism 53 (hereinafter, referred to as "hanger bracket 51 and like") along with the fixation member 71 (collapse stroke).

Meanwhile, as shown in FIG. 16, when the hanger bracket 51 is moved forward along with the inner column 22 in a state where the EA stoppers 112 are at the riding-over positions, the EA claw portions 145 ride over the telescopic lock teeth 75. Then, as shown in FIG. 9, the EA stoppers 112 are moved to the abutting position due to an urging force of the first urging member 113 and each EA claw portion 145 enters a space between the adjacent telescopic lock teeth 75. Thereafter, as shown in FIG. 17, the telescopic lock teeth 75 are engaged with the EA claw portions 145 and the hanger bracket 51 and the like are restricted from moving forward with respect to the outer column 21.

As described above, in the present embodiment, the hanger bracket 51 and the EA stoppers 112 are engaged with each other regardless of the positions (abutting positions or riding-over positions) of the EA stoppers 112 in the locked state. Therefore, at the time of the secondary collision, the inner column 22 moves forward with respect to the hanger bracket 51 and the like.

Figure 18:
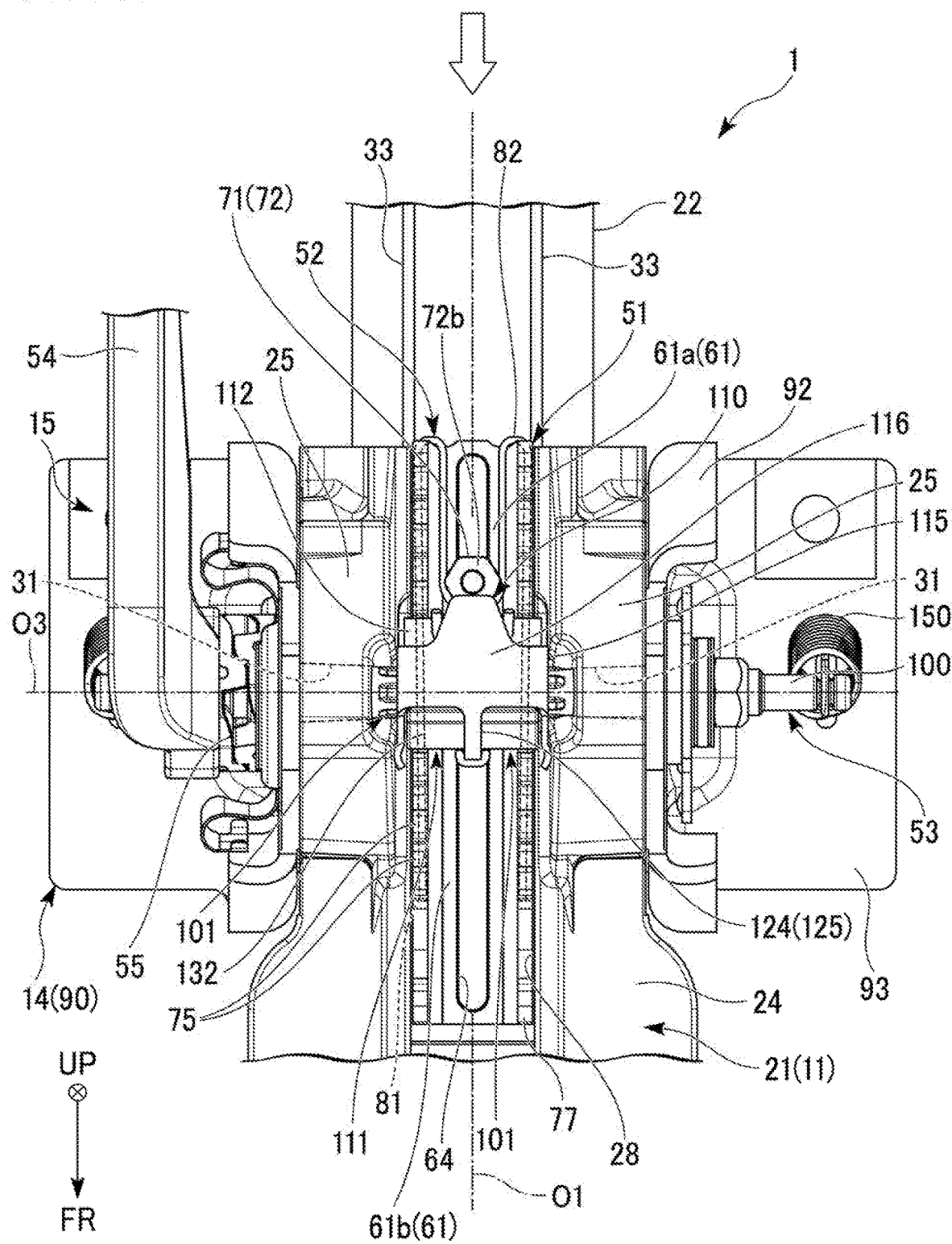
FIG. 18 is an explanatory view showing the motion at the time of the secondary collision and is a bottom view corresponding to FIG. 4.

FIG. 18 is an explanatory view showing the motion at the time of the secondary collision and is a bottom view corresponding to FIG. 4.

As shown in FIG. 18, at the time of the collapse stroke, the bolt 72 of the fixation member 71 moves forward with respect to the hanger bracket 51 and the like along the EA elongated hole 64, in accordance with forward movement of the inner column 22. When the bolt 72 moves forward, the connection portion 82 of the EA wire 52 is pulled forward. Then, the leg portions 81 are drawn forward (crumpled) through a rear side of the hanger bracket 51 and the leg portions 81 are plastically deformed. At this time, the leg portions 81 are plastically deformed while being guided by the guide portions 33 provided for the inner column 22. In addition, an impact load that is applied to the driver at the time of the secondary collision is alleviated due to a bending load generated when the EA wire 52 (leg portions 81) is plastically deformed, a sliding friction generated when the EA wire 52 slides on the inner column 22, the hanger bracket 51, or the guide portions 33, a sliding friction between the hanger bracket 51 and the inner column 22, or the like. In addition, since the guide portions 33 are provided, the leg portions 81 can move along the rear side of the hanger bracket 51 without being spread and an appropriate impact absorption load can be achieved.

Figure 19:
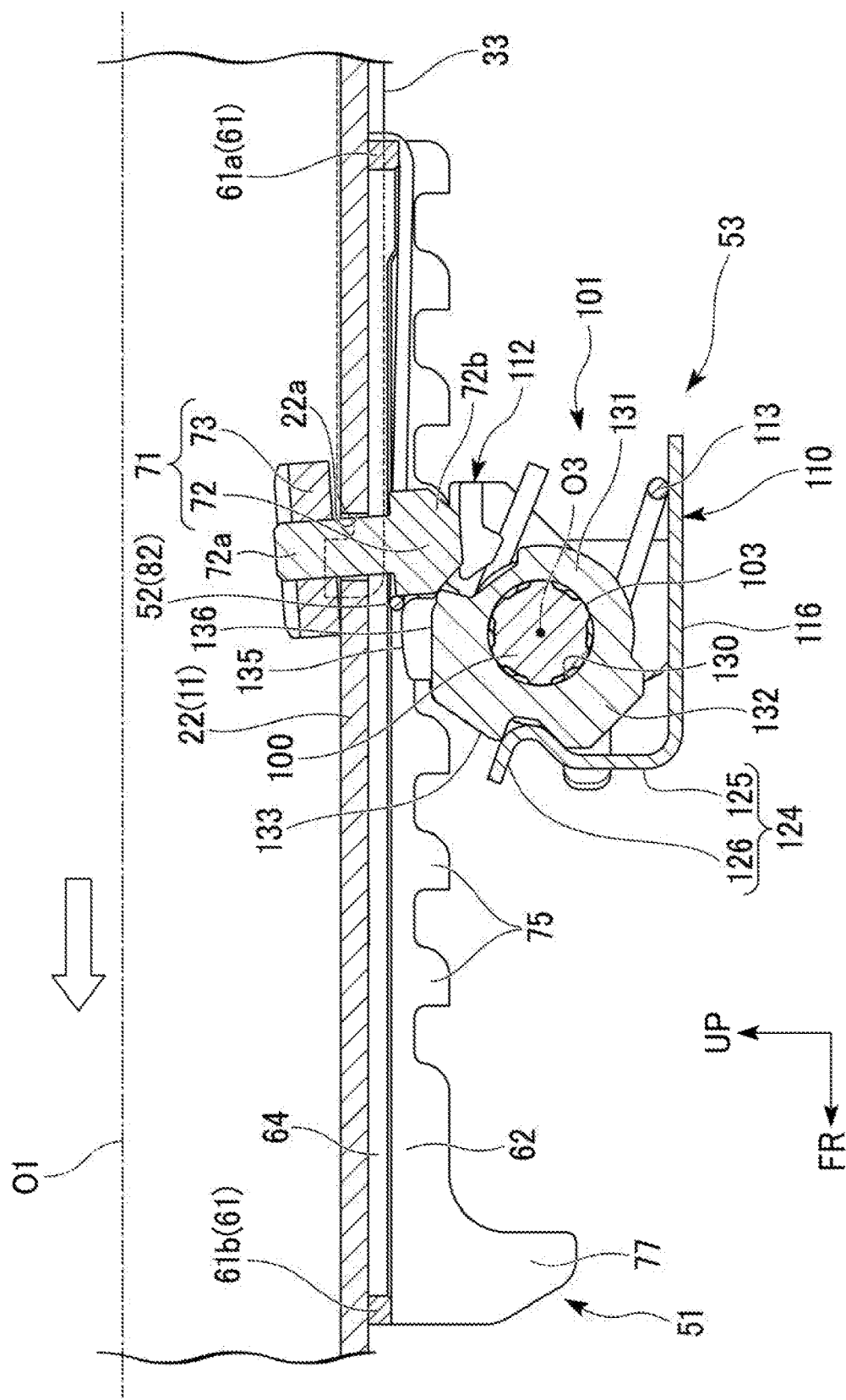
FIG. 19 is an explanatory view showing the motion at the time of the secondary collision and is a sectional view corresponding to FIG. 6.

FIG. 19 is an explanatory view showing the motion at the time of the secondary collision and is a sectional view corresponding to FIG. 6.

As shown in FIG. 19, in a process in which the fixation member 71 moves forward, the fixation member 71 enters the thin portion 61*b* after passing through the thick portion 61*a*. At the thin portion 61*b*, the bolt 72 is inclined with, for example, a contact point between the bolt 72 and the inner column 22 as a fulcrum due to a pulling force of the EA wire 52. Therefore, the head portion 72*b* of the bolt 72 slides on the thin portion 61*b* in a state of being in local contact with the thin portion 61*b*. In addition, an impact load that is applied to the driver at the time of the secondary collision is alleviated due to a sliding friction between the bolt 72 and the thin portion 61*b*.

Figure 20:
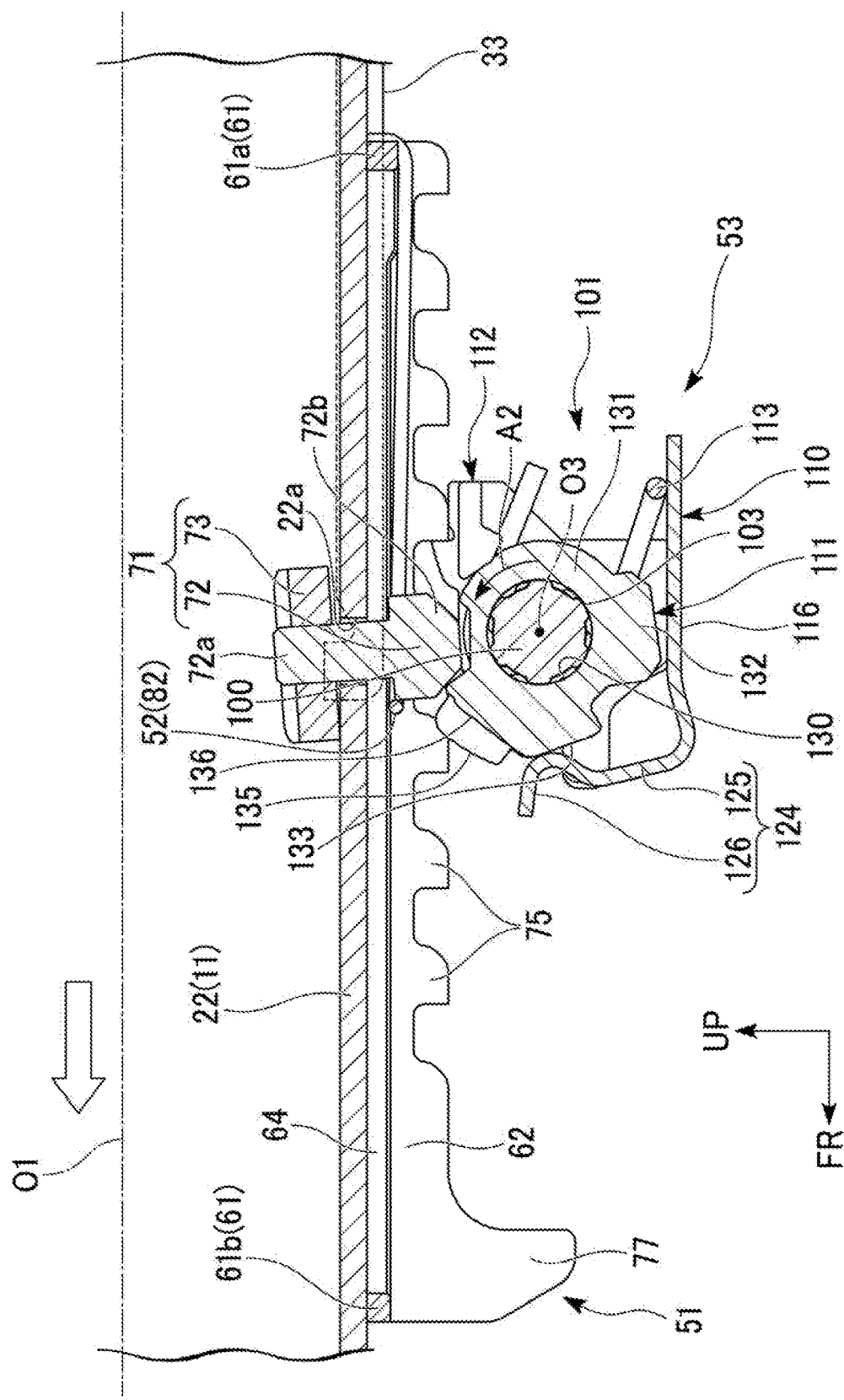
FIG. 20 is an explanatory view showing the motion at the time of the secondary collision and is a sectional view corresponding to FIG. 6.
Figure 21:
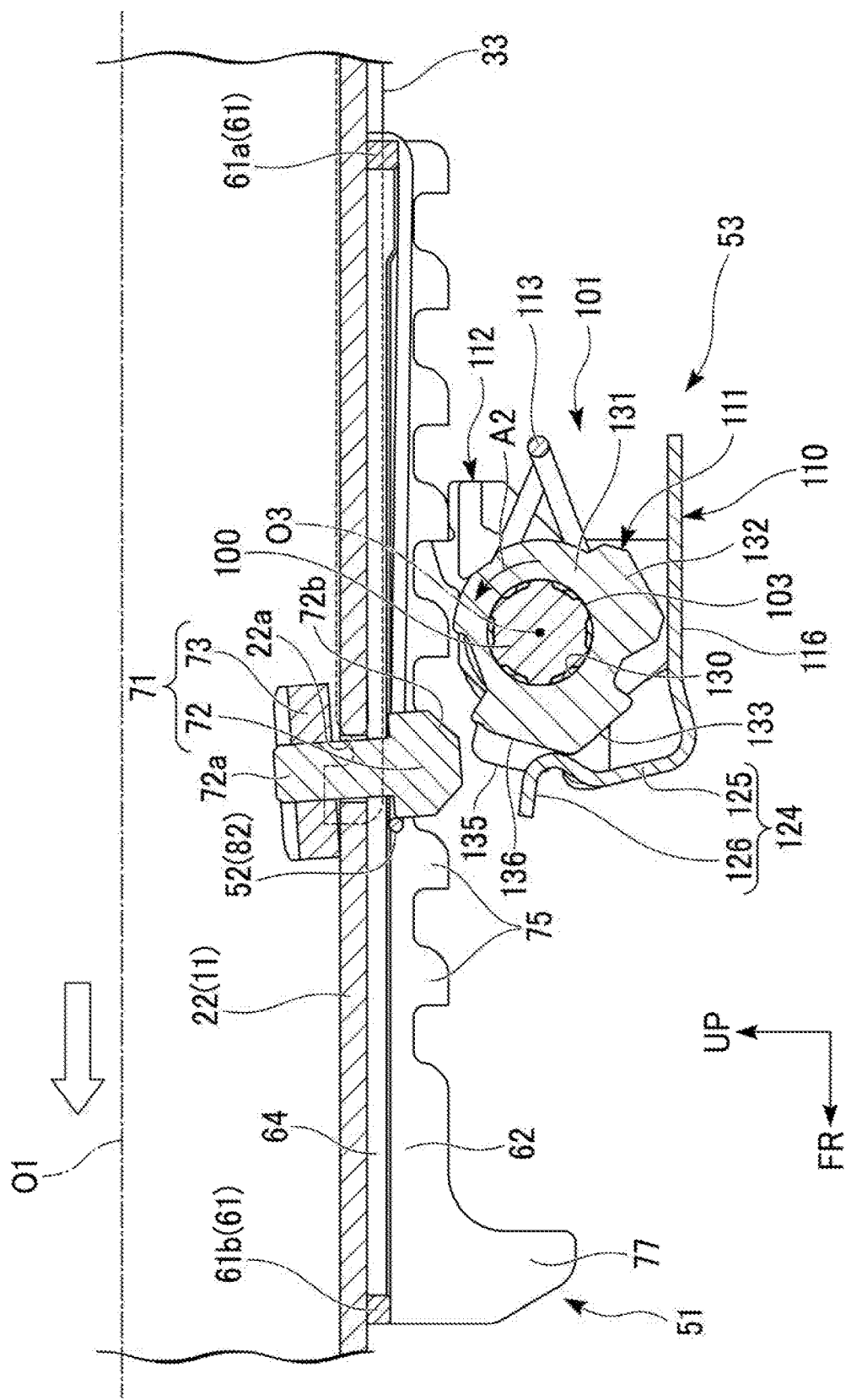
FIG. 21 is an explanatory view showing the motion at the time of the secondary collision and is a sectional view corresponding to FIG. 6.

FIGS. 20 and 21 are explanatory views showing the motion at the time of the secondary collision and are sectional views corresponding to FIG. 6.

As shown in FIG. 20, at the time of the collapse stroke, the fixation member 71 moves forward with respect to the lock mechanism 53 and thus the head portion 72*b* of the bolt 72 comes into contact with the rear side stopper 135 of the telescopic stopper 111 from the rear side. Then, the rear side stopper 135 is pressed forward by the head portion 72*b* of the bolt 72 and thus the deformation portion 124 (holding portion 126) is pressed forward via the engagement claw 133. Therefore, the deformation portion 124 is deformed to be spread with, for example, a boundary portion between the deformation portion 124 and the bottom wall 116 as an origin.

As shown in FIG. 21, the telescopic stopper 111 rotates in the direction A2 with respect to the lock bolt 100, in accordance with deformation of the deformation portion 124. When the rear side stopper 135 moves forward and downward in accordance with rotation of the telescopic stopper 111 in the direction A2, the rear side stopper 135 is withdrawn from the head portion 72*b* of the bolt 72 in a front view. Accordingly, the head portion 72*b* of the bolt 72 passes through the telescopic stopper 111 (space between EA stoppers 112) and thus the inner column 22 and the fixation member 71 further move forward.

As described above, in the present embodiment, the outer column 21 is formed with the bumping portion 152 that bumps against the bridge portion 91 before the lock bolt 100 comes into contact with the upper end inner circumferential edge of the tilting guide hole 96 at the time of the tilting motion.

According to this configuration, the bumping portion 152 comes into contact with the bridge portion 91 such that the column unit 11 is restricted from rising. Therefore, in a process in which the column unit 11 (steering wheel 2) is moved to the uppermost position, the column unit 11 can be maintained in a state where the outer circumferential surface of the lock bolt 100 abuts onto the inner circumferential surfaces of the through-holes 31 from the lower side due to urging forces of the second urging members 150. That is, it is possible to restrain the column unit 11 from wobbling with respect to the lock bolt 100. It is possible to restrain the column unit 11 from falling corresponding to a gap between the through-hole 31 and the lock bolt 100 after the locked state is entered at the uppermost position. As a result, it is possible to fix the steering wheel 2 at a desired uppermost position.

In the present embodiment, the bumping portion 152 protrudes from a portion of the outer column 21 that is surrounded by the bridge portion 91 and is configured to be able to come into contact with the bridge portion 91.

According to this configuration, it is possible to fix the steering wheel 2 at a desired uppermost position without a great change in outer shape of the steering device 1.

In the present embodiment, the upper surface of the bumping portion 152 is an inclined surface that extends to become closer to the lower side toward the rear side and the upper surface comes into contact with the bridge portion 91.

According to this configuration, the bumping portion 152 and the bridge portion 91 come into surface-contact with each other at a tilt uppermost position. Accordingly, it is possible to decrease a surface-pressure at the time of contact between the bumping portion 152 and the bridge portion 91. Therefore, it is possible to suppress deformation of the rear bracket 14 or the like that is caused by contact between the bumping portion 152 and the bridge portion 91.

FIRST MODIFICATION EXAMPLE

In the above-described embodiment, a configuration in which the bridge portion 91 is connected to intermediate portions of the rear side walls 92 in the front-rear direction. However, the invention is not limited to this configuration. For example the bridge portion 91 may be connected to front end portions of the rear side walls 92. The bridge portion 91 may be connected to rear end portions of the rear side walls 92. The position of the bumping portion 152 can be set in accordance with the position of the bridge portion 91.

SECOND MODIFICATION EXAMPLE

Figure 22:
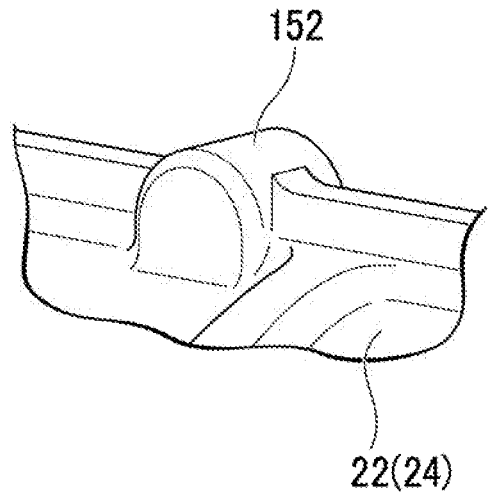
FIG. 22 is a perspective view of a steering device according to a second modification example.
Figure 23:
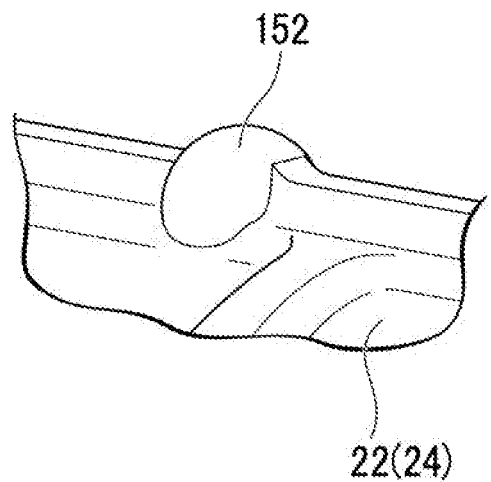
FIG. 23 is a perspective view of the steering device according to the second modification example.

In the above-described embodiment, a case where a surface (upper surface) of the bumping portion 152 that comes into contact with the bridge portion 91 is formed into a flat surface has been described. However, the invention is not limited to this configuration. For example, as shown in FIGS. 22 and 23, a surface of the bumping portion 152 that comes into contact with the bridge portion 91 may be formed into a curved surface.

According to this configuration, a contact point between the bumping portion 152 and the bridge portion 91 is likely to be stabilized even in a case where there is a variation in dimension of the bumping portion 152.

THIRD MODIFICATION EXAMPLE

Figure 24:
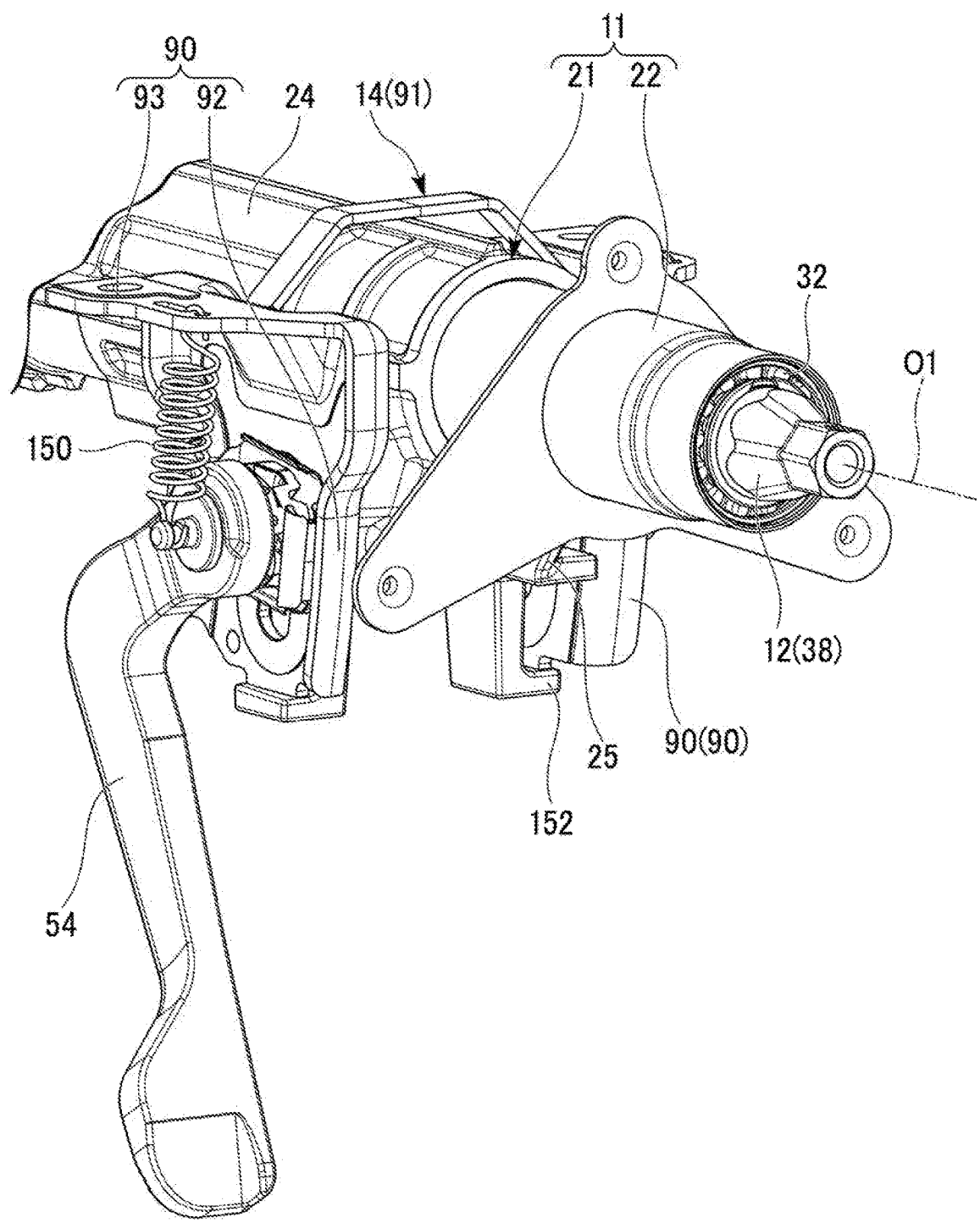
FIG. 24 is a perspective view of a steering device according to a third modification example.
Figure 25:
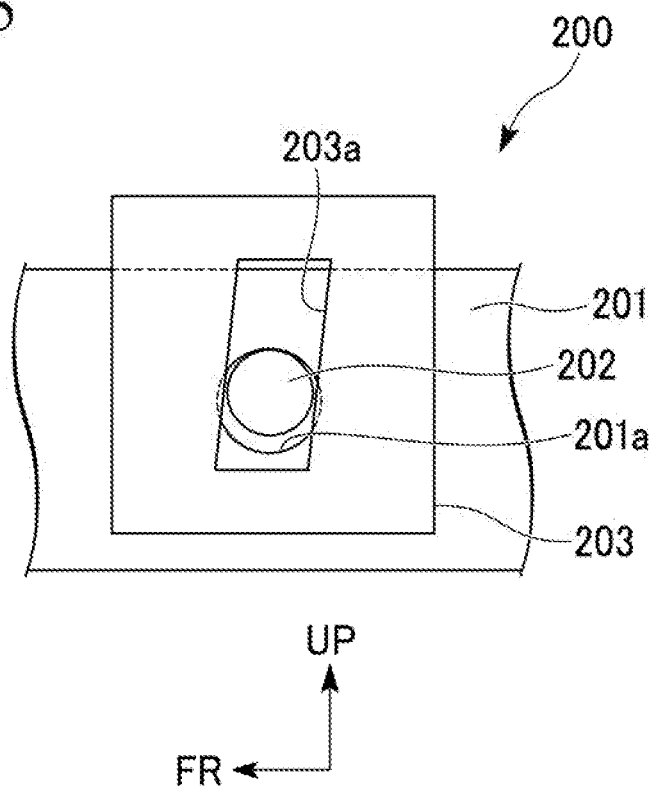
FIG. 25 is a schematic side view of a steering device in the related art.
Figure 26:
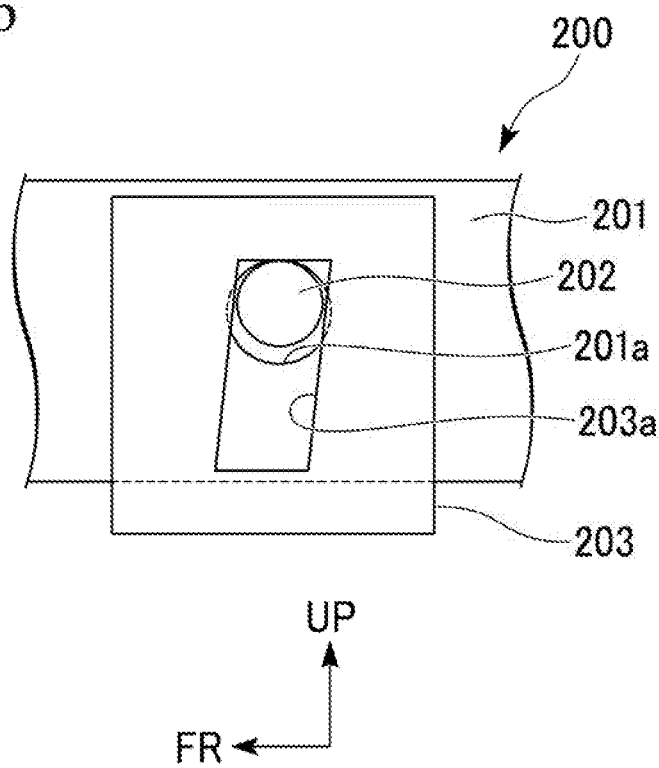
FIG. 26 is a schematic side view of the steering device in the related art.
Figure 27:
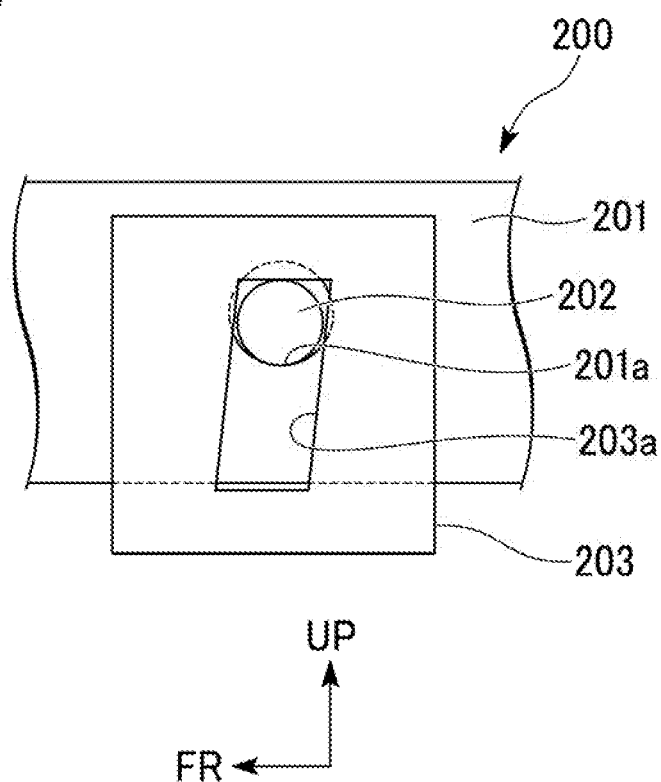
FIG. 27 is a schematic side view of the steering device in the related art.

In the above-described embodiment, a configuration in which the bumping portion 152 formed on the upper portion of the tubular holding portion 24 and the bridge portion 91 come into contact with each other has been described. However, the invention is not limited to this configuration. That is, the bumping portion 152 can be formed on any position on the column unit 11 as long as the bumping portion 152 comes into contact with the rear bracket 14 before the lock bolt 100 abuts onto the upper end inner circumferential edge of the tilting guide hole 96 in accordance with the tilting motion. For example, as shown in FIG. 24, the bumping portion 152 may protrude outward in the lateral direction from a lower end portion of the fastened portion 25. In this case, the bumping portion 152 is configured to be able to come into contact with a lower edge of the rear side wall 92 from the lower side. It is sufficient that the bumping portion 152 is formed on any one of the fastened portions 25.

In the above-described embodiment and each modification example, a configuration in which the column unit 11 is formed with the bumping portion 152 has been described. However, the invention is not limited to this configuration. For example, the bumping portion may project downward from the bridge portion 91 or the like of the rear bracket 14. The bumping portion may be formed on both of the column unit 11 and the rear bracket 14.

Hereinabove, preferred examples of the present invention have been described. However, the present invention is not limited to the examples. Modifications such as addition, omission, substitution, and the like of components can be made without departing from the spirit of the present invention. The present invention is not limited by the above description and is only limited by appended claims.

For example, in the above-described embodiment, a configuration in which the axis O1 intersects the front-rear direction has been described. However, the invention is not limited to this configuration. The axis O1 may coincide with the front-rear direction of the vehicle.

In the above-described embodiment, a configuration in which the inner column 22 is provided with the hanger bracket 51 such that the hanger bracket 51 faces the lower side has been described. However, the invention is not limited to this configuration. For example, the inner column 22 may be provided with the hanger bracket 51 such that the hanger bracket 51 faces the upper side or a lateral side.

In the above-described embodiment, a configuration in which the entire collapse stroke region overlaps the telescopic stroke region has been described. However, the invention is not limited to this configuration. For example, the collapse stroke region and the telescopic stroke region may be arranged in the front-rear direction.

In the above-described embodiment, a configuration in which the telescopic stopper 111 is held by the holder 110 has been described. However, the invention is not limited to this configuration.

In the above-described embodiment, the guide portions 33, the EA wire 52, the top plate portion 61, and the like have been described as an example of a sliding friction portion. However, the invention is not limited to this configuration as long as a sliding friction portion is provided with at least one of the guide portions 33, the EA wire 52, and the top plate portion 61. A member other than the guide portions 33, the EA wire 52, and the top plate portion 61 may be used as a sliding friction portion as long as the sliding friction portion slides on at least one of the inner column 22 and the hanger bracket 51 at the time of the collapse stroke. A coating material having a high frictional coefficient may be applied to each sliding portion.

In the above-described embodiment, a configuration in which the second urging members 150 are interposed between the lock bolt 100 and the rear bracket 14 has been described. However, the invention is not limited to this configuration. The second urging members 150 may be connected to a portion other than the rear bracket 14 as long as the second urging members 150 urge the column unit 11 upward via the lock bolt 100.

In the above-described embodiment, the description has been made while using the steering device 1 capable of performing both of the telescopic motion and the tilting motion as an example. However, it is sufficient that the steering device 1 can perform at least the tilting motion.

In addition to above, a constituent element in the above-described embodiment can be appropriately substituted with a known constituent element without departing from the spirit of the invention and the above-described modification example may be appropriately combined with the embodiment.

What is claimed is:

1. A steering device comprising:
a column unit that includes an outer column and an inner column provided inside the outer column movably in a front-rear direction and that supports a steering shaft such that the steering shaft rotates around a first axis extending in the front-rear direction;
a front bracket that is attached to a vehicle body and that supports the outer column such that the column unit rotates around a second axis extending in a lateral direction;
a lock bolt that is inserted into a through-hole penetrating the outer column in the lateral direction;
a rear bracket that is provided with a tilting guide hole guiding vertical movement of the lock bolt in accordance with rotation of the outer column and that is attached to the vehicle body at a position behind the front bracket; and
an urging member that is connected to the lock bolt and urges the column unit upward via the lock bolt,
a hanger bracket that engages with the inner column via the lock bolt to restrict movement of the inner column relative to the outer column in the front-rear direction in telescopic motion,
wherein the outer column is provided with a bumping portion that restricts the outer column from rising by causing the outer column and the rear bracket to come into contact with each other before the lock bolt abuts onto an upper end inner circumferential edge of the tilting guide hole in accordance with rotation of the column unit about the second axis in tilting motion.

2. The steering device according to claim 1,
wherein the rear bracket is provided with an upper wall portion that straddles an upper portion of the column, and
wherein the bumping portion protrudes from a portion of the outer column that is surrounded by the upper wall portion and is configured to come into contact with the upper wall portion.

3. The steering device according to claim 1,
wherein the bumping portion is provided with a contact surface that comes into contact with the rear bracket, and
wherein the contact surface is an inclined surface that extends to become closer to a lower side toward a rear side.

4. The steering device according to claim 1,
wherein the bumping portion is formed in a curved shape that protrudes upward.

5. The steering device according to claim 1,
wherein the urging member is connected to portions of the lock bolt located on both sides of the in the lateral direction.

6. The steering device according to claim 1,
wherein the rear bracket has a pair of side plate portions that are arranged on both sides in the lateral direction of the column,
wherein each of the pair of side plate portions is provided with the tilt guide hole, and
the bumping portion protrudes in the lateral direction from the portions of the outer column that are located below the pair of side plate portions, such that the bumping portion can contact the pair of side plate portions from below.

\* \* \* \* \*